United States Patent
Zhang et al.

(10) Patent No.: US 9,940,397 B2
(45) Date of Patent: Apr. 10, 2018

(54) SEARCH METHOD, APPARATUS, AND ELECTRONIC DEVICE

(71) Applicant: Tencent Technology (Shenzhen) Company Limited, Shenzhen (CN)

(72) Inventors: Xiaolong Zhang, Shenzhen (CN); Wei Luo, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 643 days.

(21) Appl. No.: 14/588,831

(22) Filed: Jan. 2, 2015

(65) Prior Publication Data

US 2015/0120710 A1   Apr. 30, 2015

Related U.S. Application Data

(63) Continuation of application No. PCT/CN2014/084715, filed on Aug. 19, 2014.

(30) Foreign Application Priority Data

Sep. 17, 2013 (CN) .......................... 2013 1 0425013

(51) Int. Cl.
   *G06F 17/30* (2006.01)

(52) U.S. Cl.
   CPC .. *G06F 17/30867* (2013.01); *G06F 17/30572* (2013.01); *G06F 17/30873* (2013.01); *G06F 17/30991* (2013.01)

(58) Field of Classification Search
   CPC ......... G06F 17/30867; G06F 17/30572; G06F 17/30873; G06F 17/30991

(Continued)

(56) References Cited

U.S. PATENT DOCUMENTS

| 9,069,862 | B1 * | 6/2015 | Perkowitz .......... G06F 17/30867 |
| 2005/0228788 | A1 | 10/2005 | Dahn et al. |

(Continued)

FOREIGN PATENT DOCUMENTS

| CN | 101075239 A | 11/2007 |
| CN | 102033894 A | 4/2011 |
| CN | 102982175 A | 3/2013 |

OTHER PUBLICATIONS

Tencent Technology, ISRWO, PCT/CN2014/084715, dated Nov. 19, 2014, 9 pgs.

(Continued)

*Primary Examiner* — Evan Aspinwall
(74) *Attorney, Agent, or Firm* — Morgan, Lewis & Bockius LLP

(57) ABSTRACT

A method of searching content is provided. The method includes receiving, in a social media messaging program, a search request including one or more search terms from a user of a client device. The method further includes searching, among the user's contacts locally stored on the client device, for contacts matching with the one or more search terms to produce first search results displaying a least a subset of the first search results and one or more search navigation affordances. At least one of the search navigation affordances corresponds to second search results of a first content type that are shared by the user and other users and at least one of the search navigation affordances corresponds to third search results of a second content type different from the first content type that are associated with the user.

20 Claims, 21 Drawing Sheets

(58) Field of Classification Search
USPC .......................................................... 707/700
See application file for complete search history.

(56) References Cited

U.S. PATENT DOCUMENTS

2011/0078184 A1* 3/2011 Song .................... G06Q 10/107
707/770
2011/0295978 A1 12/2011 Pazos et al.

OTHER PUBLICATIONS

Tencent Technology, IPRP, PCT/CN2014/084715, dated Mar. 22, 2016, 7 pgs.

\* cited by examiner

1300

1302 — Receive, in a social media messaging program, a search request including one or more search terms

1304 — In accordance with a predefined search type hierarchy, search content of a first set of content types of a plurality of content types to produce first search results.

The search is based on the search request.

The predefined search type hierarchy specifies an order with which content types in the plurality of content types are to be searched.

1306 — The plurality of content types includes one or more of the group consisting of: user pages corresponding to users who are connected with the user, public pages followed by the users, user pages corresponding to users who are not connected with the user, public pages not followed by the users, local files, local directories, and web content

1308 — The first set of content types consist of a single first content type and second set of content types consist of a single second content type

1310 — Determine a count of the first search results

1312 — When the count of first search results is greater than or equal to a predefined number, display the first search results and affordances for searching content of one or more other content types in the plurality of content types

1314 — The predefined number is one

FIG. 13A

SEARCH METHOD, APPARATUS, AND ELECTRONIC DEVICE

RELATED APPLICATIONS

This application is a continuation application of PCT Patent Application No. PCT/CN2014/084715, entitled "SEARCH METHOD, APPARATUS, AND ELECTRONIC DEVICE" filed on Aug. 19, 2014, which claims priority to Chinese Patent Application No. 201310425013.9, "SEARCH METHOD, APPARATUS, AND ELECTRONIC DEVICE," filed on Sep. 17, 2013, both of which are hereby incorporated by reference in their entirety.

TECHNICAL FIELD

The present application relates to the field of computer network technologies, and more particularly to a search method, an apparatus, and an electronic device.

BACKGROUND

The role of social media and social networking has expanded in our daily lives. For example, rather than merely following other user's posts, some social media services now allow users to chat with one another, make payments to one another, play games with friends and strangers alike, follow public figures and business, and so on.

A consequence of the expansion of social media is a need for intelligent search methods that allow users to search for many different types of content at once, while simultaneously directing users to the types of content that they are most interested in.

SUMMARY

To address the aforementioned needs for search in the context of social media and social networking, a method is provided that is performed at a mobile client device executing a social media messaging program. The method includes receiving, in the social media messaging program, a search request including one or more search terms from a user of the mobile client device. The method further includes searching, among the user's contacts locally stored on the mobile client device, for contacts matching with the one or more search terms to produce first search results and displaying a least a subset of the first search results and one or more search navigation affordances. At least one of the search navigation affordances corresponds to second search results of a first content type that are shared by the user and other users and at least one of the search navigation affordances corresponds to third search results of a second content type different from the first content type that are associated with the user.

To address the aforementioned needs for search in the context of social media and social networking another method is provided that is performed at a mobile client device executing a social media messaging program. The method includes receiving, in the social media messaging program, a search request including one or more search terms. The method further includes, in accordance with a predefined search type hierarchy, searching content of a first set of content types of a plurality of content types to produce first search results. The search is based on the search request and the predefined search type hierarchy specifies an order with which content types in the plurality of content types are to be searched. The method further includes determining a count of the first search results. The method further includes, when the count of first search results is greater than or equal to a predefined number, displaying the first search results and affordances for searching content of one or more other content types in the plurality of content types. The method further includes, when the count of first search results is less than the predefined number, in accordance with the predefined search type hierarchy, searching content of a second set of content types of the plurality of content types to produce second search results and displaying the second search results.

In another aspect of the present disclosure, to address the aforementioned needs for search in the context of social media and social networking, some implementations provide a non-transitory computer readable storage medium storing one or more programs. The one or more programs comprise instructions, which when executed by an electronic device with one or more processors and memory, cause the electronic device to perform any of the methods provided herein.

In yet another aspect of the present disclosure, to address the aforementioned needs for search in the context of social media and social networking, some implementations provide an electronic device. The electronic device includes one or more processors, memory, and one or more programs. The one or more programs are stored in memory and configured to be executed by the one or more processors. The one or more programs include an operating system and instructions that when executed by the one or more processors cause the electronic device to perform any of the methods provided herein.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

FIGS. 13A-13B are a flowchart illustrating another method of search, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
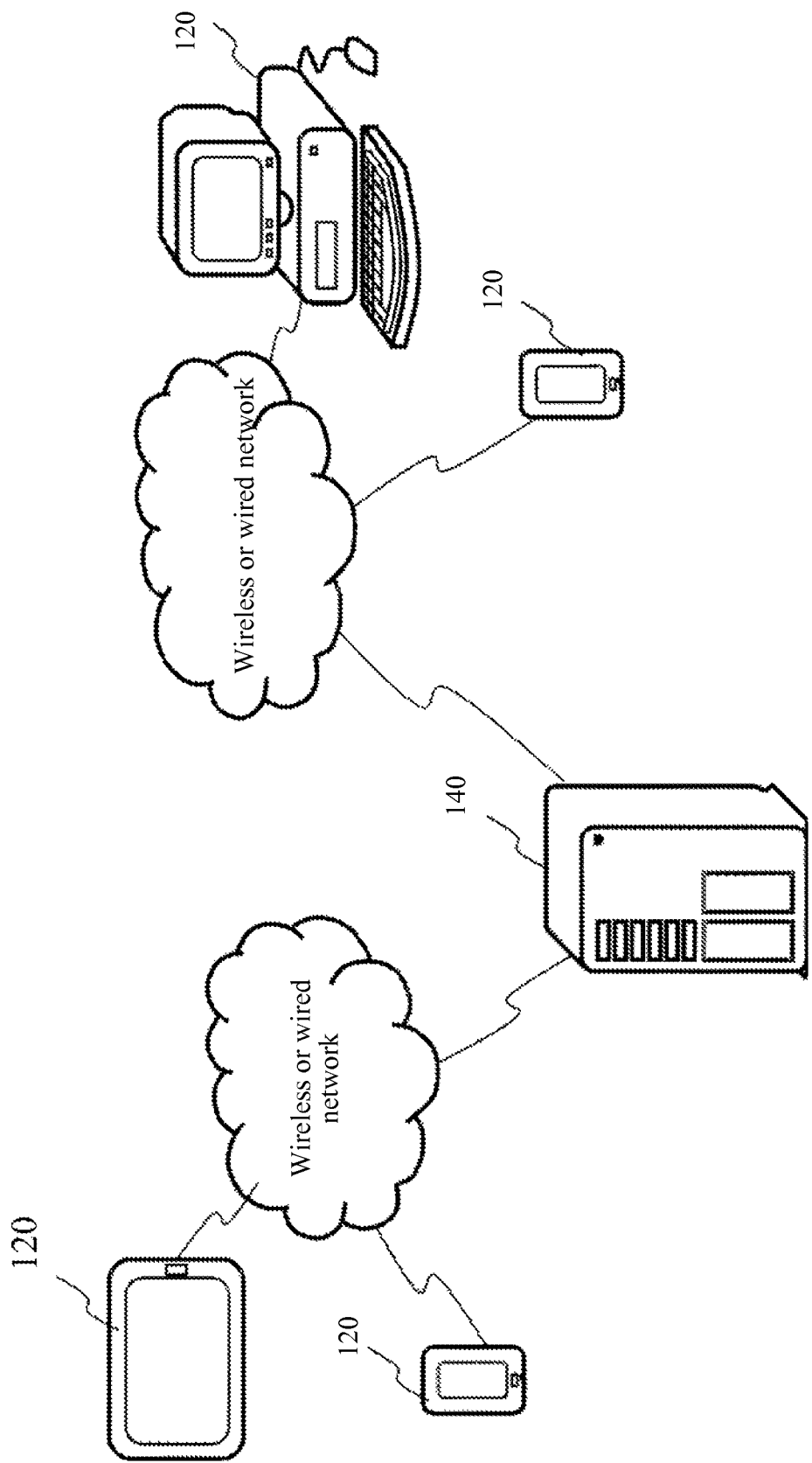
FIG. 1 is a schematic structural diagram of an environment involved by a search method, in accordance with some embodiments.

FIG. 1 is a schematic structural diagram of an implementation environment involved by a search method, in accordance with some embodiments. The implementation environment includes at least one client device 120 and at least one server 140.

The client device 120 may be an electronic device in which a client of an instant messaging program runs. The electronic device may be a smart phone, a tablet computer, a smart TV, an e-book reader, a Moving Picture Experts Group Audio Layer III (MP3) player, a Moving Picture Experts Group Audio Layer IV (MP4) player, a laptop computer, a desktop computer, or the like.

The client device 120 and the server 140 may be connected through a wireless network or a wired network.

The server 140 may be one server, a server cluster formed by multiple servers, or a cloud computing service center. The server 140 may be a backend server of an instant messaging program.

Figure 2:
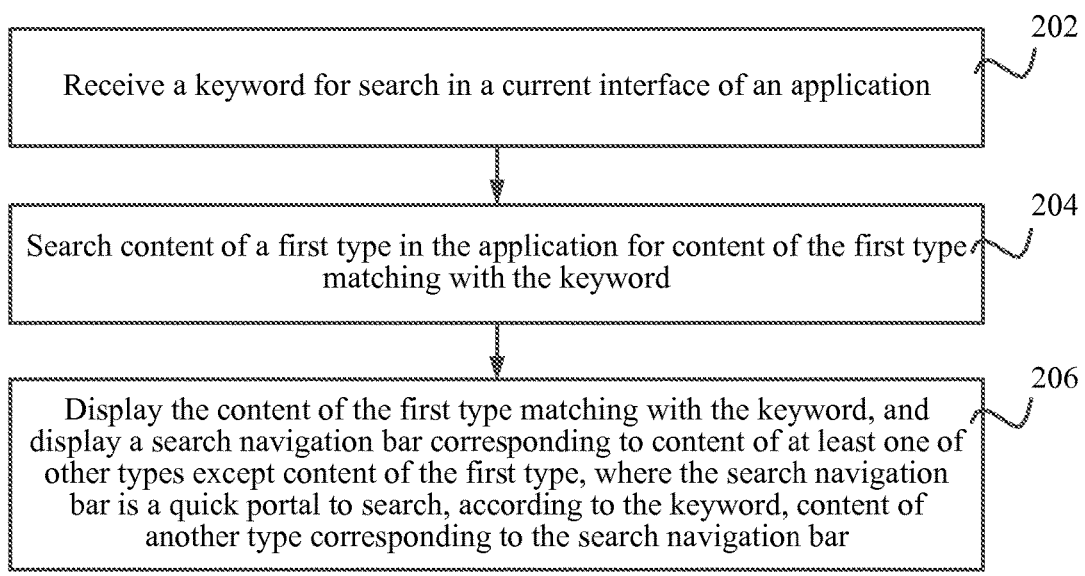
FIG. 2 is a method flowchart of a search method, in accordance with some embodiments.

FIG. 2 is a method flowchart of a search method, in accordance with some embodiments. The application of the search method to the client device shown in FIG. 1 is used as an example for description. The search method includes:

Step 202: Receive a keyword for search in a current interface of an application.

The application includes content of at least two types, and the current interface may be an interface corresponding to content of any type.

Step 204: Search content of a first type in the application for content of the first type matching with the keyword.

Step 206: Display the content of the first type matching with the keyword, and display search navigation bars corresponding to content of other types except content of the first type, where the search navigation bars are quick portals to search, according to the keyword, content of other types corresponding to the search navigation bars.

By using the application being an instant messaging program as an example, when a personal account added as a friend and a followed public account are determined as content of a first type, a personal account added as a friend and a followed public account that match with the keyword are directly displayed, and a search navigation bar for a personal account that has not been added as a friend and a public account that has not been followed, a search navigation bar for a conversation record, and a search navigation bar for collected content are also displayed.

In conclusion, in some embodiments of the search method, a keyword for search is received in a current interface of an application. Content of a first type in the application is searched for content of the first type matching with the keyword. The content of the first type matching with the keyword is displayed, and search navigation bars corresponding to content of other types except content of the first type are also displayed. The method solves the problem of time-consuming and inefficient search caused by switching between interfaces corresponding to content of different types in a search method in which content of different types needs to be searched in search boxes in different interfaces. Therefore, global search can be accomplished in only one search interface, thereby reducing the number of times of switching between search interfaces, saving search time, and improving search efficiency.

Content of the first type may be determined in two different manners: 1. determining content of a preset type as content of the first type; and 2. determining content corresponding to the current interface as content of the first type. Therefore, in the following, two different embodiments are used to describe in detail the two manners.

Figure 3:
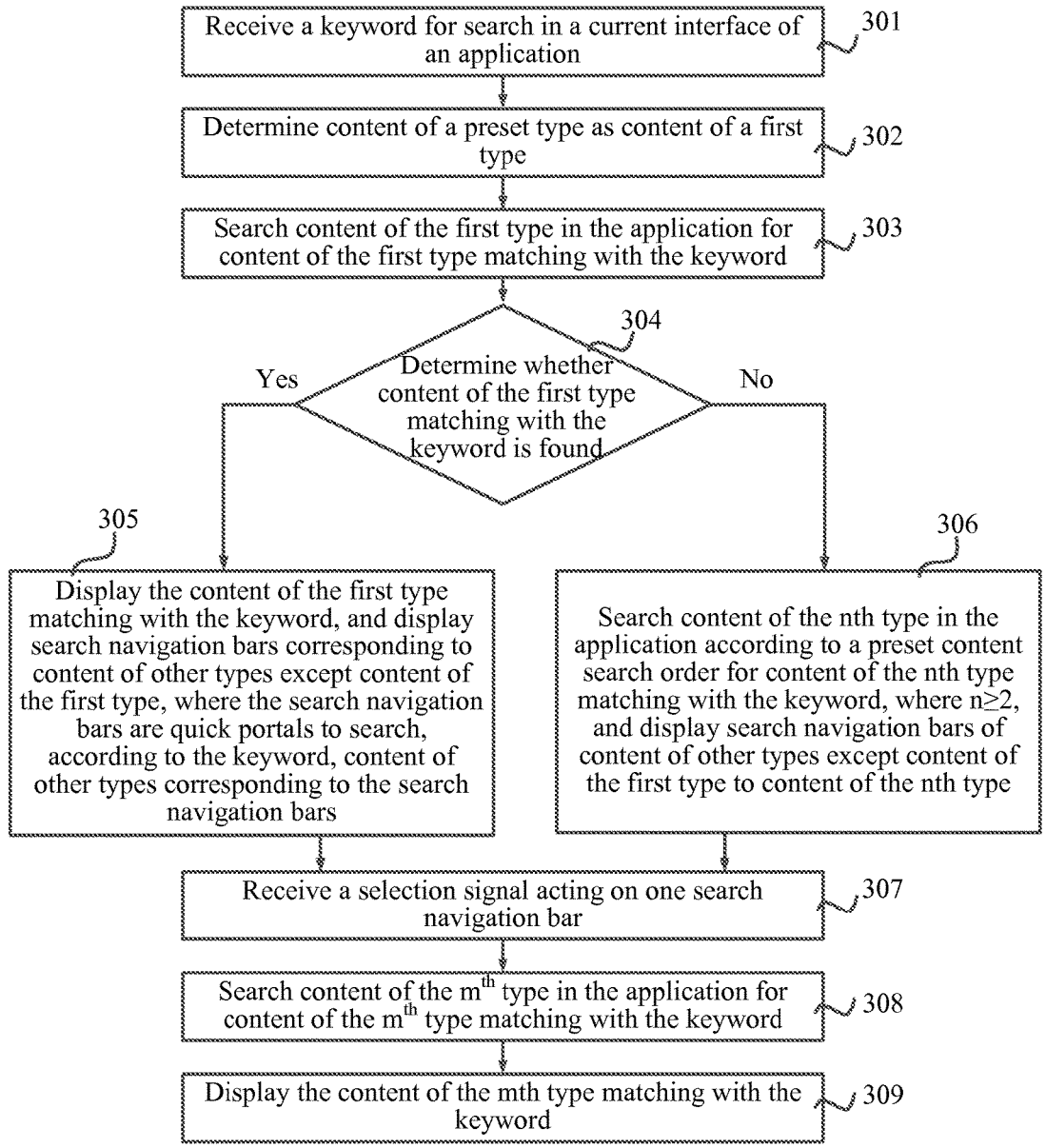
FIG. 3 is a method flowchart of a search method, in accordance with some embodiments.

FIG. 3 is a method flowchart of a search method, in accordance with some embodiments. The following example is used for description: the search method is performed on the client device shown in FIG. 1 (e.g., a mobile client device), an application is an instant messaging program, and content of a preset type is determined as content of a first type. The search method includes:

Step 301: Receive one or more keywords for search in a current interface of an application.

A client device receives the keywords for search in the current interface of the application. Specifically, the client device receives the keywords for search in a search input box in the current interface of the application. In some embodiments, the current user interface is a user interface in a social media messaging program. The client device receives, in the social media messaging program, a search request including one or more search terms (e.g., the keywords) from a user of the client device.

In the following, an instant messaging program is used as an example of the application. The current interface may be an interface for an address book in the instant messaging program, an interface for adding a friend, an interface for conversation records, or an interface for viewing collected content (e.g., web content).

The keyword may be one or more characters, one or more words, a combination of a character and a word, one or more numbers, where the numbers may indicate an account ID of a user in the instant messaging program, or one or more letters.

Because a user usually searches for content of several fixed types, before the user inputs a keyword, the client device displays by default past search histories in a drop-down list in the search input box in the current interface, so as to facilitate use of the search method by the user. For example, the number of search histories that are displayed by default may be three, five, etc.; and search histories are, in various embodiments, displayed according to actual needs and/or a preset threshold. Alternatively, search histories that are frequently searched by the user are displayed by default and search histories are displayed according to actual needs and/or a preset threshold. The user may further choose to keep or clear the search histories.

If a search history matching with a keyword to be searched exists in the search histories, the user no longer needs to input a keyword for search again and may directly select, in the search histories, the search history matching with the keyword. If no search history matching with the keyword to be searched exists in the search histories and the user finds that the search histories hamper the search, the user may click an option of removing the search histories below the search histories to remove the search histories. The user may also choose not to remove the search histories, which do not affect the search.

It should be further noted that when the search input box is clicked by using a cursor, a title bar in the current interface, content in the current interface, and a speech input button in the search input box may be hidden, so that the current interface looks simpler. By using a smart phone as an example of the client device, referring to FIG. 4A, when the search input box is clicked by using a cursor, the title bar, namely, the words "Address Book", in the in the current interface, content such as "Add a Friend", "Public Account", "A", "andraw", "andy", "Android User", "B", "Beki", and "betty" in the current interface, and a speech input button 400 located on the right side of the search input box are hidden.

Step 302: Determine content of the preset type as content of the first type.

The client device determines content of the preset type as content of the first type. In some embodiments, the preset content is a personal account added as a friend and a followed public account. Stated another way, content of the first type may be regarded as content in a local address book. That is, regardless of whether the current interface in Step 301 is an interface of an address book, an interface of adding a friend, an interface of a conversation record, or an interface of collected content, the client device always determines a personal account added as a friend and a followed public account as content of the first type.

As shown in this example, in some embodiments, the client device also always determines that content of a second type is a personal account that has not been added as a friend and a public account that has not been followed, content of a third type is a conversation record, and content of a fourth type is collected content. Stated another way, various types of content are ranked according to a search type hierarchy.

The search type hierarchy may be established in any number of ways. For example, in some embodiments, the search type hierarchy is established by the user (e.g., the user enters her preferences for search priorities). In some embodiments, the search type hierarchy is determined in accordance with the current user interface (e.g., when the current user interface is an address book user interface, address book entries such as contacts, comprise content of the first type).

Step 303: Search content of the first type in the application for content of the first type matching with the keyword.

The client device searches content of the first type corresponding to a current account in the application for content of the first type matching with the keyword. Using user contacts as an example of content of the first type, in some embodiments, the client device searches, among the user's contacts locally stored on the client device, for contacts matching with the search term (e.g., input keyword) to produce search results (e.g., one or more matching contacts).

Stated another way, for example, the client device searches content of the address book in the application for personal accounts of users added as friends and followed public accounts that match with the keyword.

Step 304: Determine whether the content of the first type matching with the keyword is found.

The client device determines whether content matching with the keyword exists in personal accounts added as friends and followed public accounts.

If a determination result is that a personal account added as a friend and a followed public account that match with the keyword are found, the process turns to Step 305.

If a determination result is that a personal account added as a friend and a followed public account that match with the keyword are not found, the process turns to Step 306.

Step 305: Display the content of the first type matching with the keyword, and display search navigation bars corresponding to content of other types except content of the first type in the application.

The search navigation bars are quick portals to search, according to the keyword, content of other types corresponding to the search navigation bars. Each search navigation bar generally corresponds to content of another type except content of the first type.

In some embodiments, the search navigation bars include a search navigation bar 431 corresponding to content of the second type, a search navigation bar 432 corresponding to content of the third type, and a search navigation bar 433 corresponding to content of the fourth type.

Figure 4A:
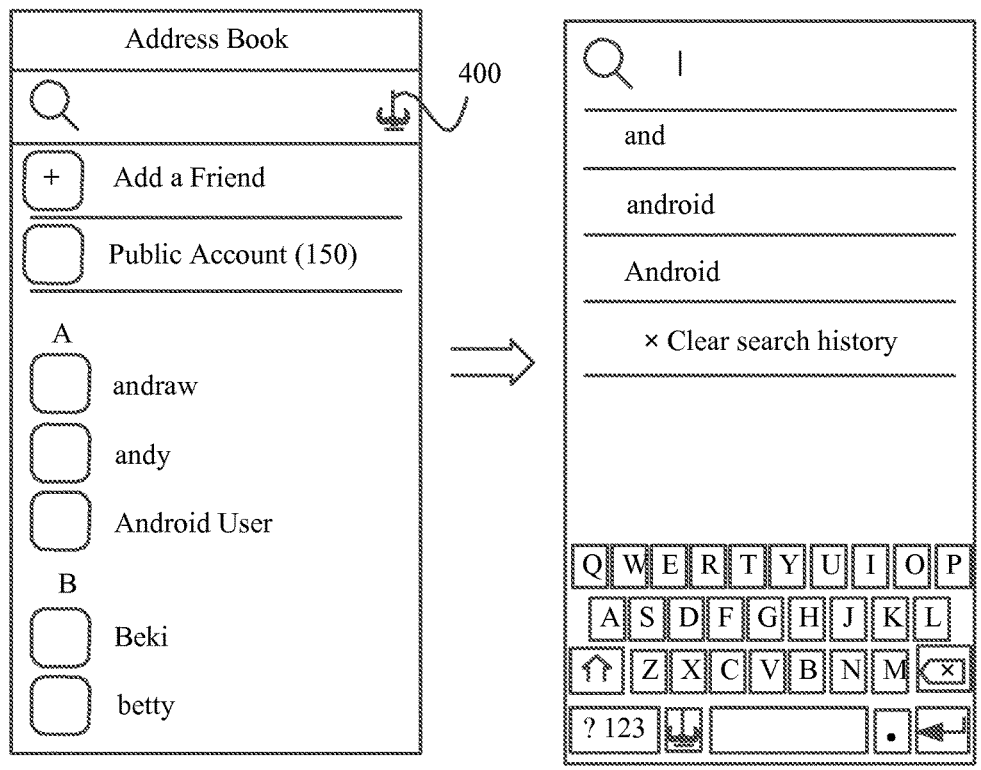
FIG. 4A is a schematic diagram of a search interface, in accordance with some embodiments.
Figure 4B:
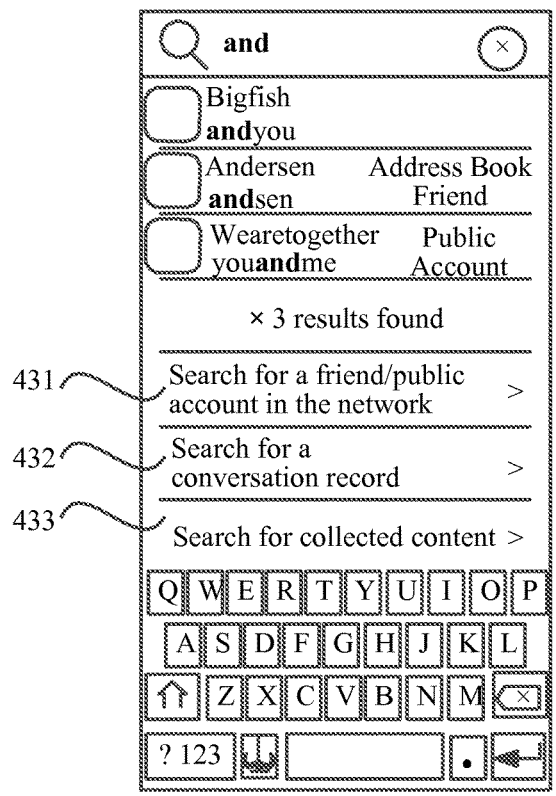
FIG. 4B is a schematic diagram of a search interface, in accordance with some embodiments.

As shown in FIG. 4B, an input keyword is "and". In this example, content of the first type comprises content corresponding to user's who are connected to the user (also called "contacts"; "friends"; "connections" or any other similar term used in the art). Among these contacts, several match the input keyword (e.g., search term), including: "Bigfish (and you)"; "Anderson (andsen)"; and "Wearetogether (you and me)." These displayed search results comprise at least a subset of search results of the content of the first type (e.g., in some circumstances, only a subset of search results is shown if there are too many search results to neatly display at once).

Also displayed is search navigation bar 431 (e.g., a search navigation affordance). The search navigation bar 431 "Search for a friend/public account in the network" corresponds to content of the second type and is displayed below content of the first type (e.g., less prominently). This is an example of a displayed search navigation affordance that corresponds to search results of the second content type. The search results of the second content type are shared by the user and other users, meaning that other users can also search for friends/public accounts in the network. Stated another way, the search navigation bar 431 is used to search for a personal account that has not been added as a friend and a public account that has not been followed that match with the keyword.

The search navigation bar 432 "Search for a conversation record" (e.g., another search navigation affordance) corresponding to content of the third type is also displayed. The search navigation bar 432 may be used to Search for a conversation record matching with the keyword. This is an example of a displayed search navigation affordance that corresponds to search results of the third content type. The search results of the third content type are associated with the user (such as conversations). In some embodiments, the search results of the third content type are uniquely associated with the user or uniquely associated with the user and a small group of other users (e.g., those users involved in a conversation). In some embodiment, content of the third content type is stored on a server remote from the client device.

The search navigation bar 433 "Search for collected content" (e.g., another search navigation affordance) corresponding to content of the fourth type is also displayed. The search navigation bar 433 may be used to Search for collected content matching with the keyword.

As used herein, the term affordance is used to mean a feature of an electronic device whose selection or activation invokes a function, such as a specific search. Examples of affordance include buttons, nobs, switches, etc., which can be "virtual" (e.g., on a touch screen display) or physical. As described below, when a search navigation affordance is selected, search results corresponding to the search navigation affordance are displayed.

Step 306: Search content of the nth type in the application according to a preset content search order for content of the nth type matching with the keyword, where n≥2, and display search navigation bars of content of other types except content of the first type to content of the nth type.

The preset content search order is set as: content of the first type, content of the second type, content of the third type, and content of the fourth type. Thus, there is a predetermined search type hierarchy in which the content search order is ranked.

If a determination result is that content of the first type matching with the keyword is not found, the client device searches content of the second type for content of the second type matching with the keyword. When content of the second type matching with the keyword is found, the client device displays the content of the second type matching with the keyword, and displays at least one search navigation bar for content of another type except content of the first type and content of the second type, that is, displays search navigation bars corresponding to content of the third type and content of the fourth type.

When content of the second type matching with the keyword is not found either, the client device searches content of the third type for content of the third type matching with the keyword. When content of the third type matching with the keyword is found, the client device displays the content of the third type matching with the keyword, and displays at least one search navigation bar for content of another type except content of the first type to content of the third type, that is, displays a search navigation bar corresponding to content of the fourth type.

When content of the third type matching with the keyword is not found either, the client device searches content of the fourth type for content of the fourth type matching with the keyword. When content of the fourth type matching with the keyword is found, the client device displays the content of the fourth type matching with the keyword. Because there is no more content of other types, a search navigation bar is no longer displayed.

When content of the fourth type matching with the keyword is not found, that is, the client device fails to find, in content of all types, content matching with the keyword, the client device displays prompt information that no search result is found.

Step 307: Receive a selection signal acting on (e.g., selection of) one of the search navigation bars.

In a case where a search navigation bar is displayed, the client device receives a selection signal acting on one search navigation bar. The selection signal is triggered by a user by clicking a search navigation bar when the user needs to search content in the search navigation bar. Stated another way, in some embodiments, the client devices receives an input corresponding to selection of a search navigation affordance.

For example, in FIG. 4B, if content that the user needs to find is in the search navigation bar 431, the user may click the search navigation bar 431. Correspondingly, the client device receives a selection signal acting on the search navigation bar 431. If content that the user needs to find is in the search navigation bar 432, the user may click the search navigation bar 432. Correspondingly, the client device receives a selection signal acting on the search navigation bar 432. If content that the user needs to find is in the search navigation bar 433, the user may click the search navigation bar 433. Correspondingly, the client device receives a selection signal acting on the search navigation bar 433.

Step 308: Search content of the $m^{th}$ type in the application for content of the $m^{th}$ type matching with the keyword.

The client device searches content of the mth type corresponding to the current account in the application for content of the mth type matching with the keyword, where content of the mth type is content of a type corresponding to a search navigation bar selected by the selection signal, and m≥2. In some embodiments, in response to the input corresponding to selection of the search navigation affordance, the client device triggers a search on a server remote from the client device to produce search results for the corresponding content type. Alternatively, this search is performed prior to displaying the search navigation affordance (e.g., step 308 occurs prior to step 305).

For example, in FIG. 4B, the search navigation bar 431 corresponds to a personal account that has not been added as a friend and a public account that has not been followed, the search navigation bar 432 corresponds to conversation records, and the search navigation bar 433 corresponds to collected content.

If the search navigation bar selected by the selection signal is the search navigation bar 431, and content of the second type corresponding to the search navigation bar 431 is a personal account that has not been added as a friend and/or a public account that has not been followed, the client device searches content of the second type in the application for content of the second type matching with the keyword. In other words, the client device searches personal accounts that have not been added as friends corresponding to the current account in the application for a personal account exactly matching with the keyword and searches public accounts that have not been followed corresponding to the current account in the application for a public account roughly matching with the keyword.

If the search navigation bar selected by the selection signal is the search navigation bar 432, and content of the third type corresponding to the search navigation bar 432 is a conversation record, the client device searches content of the third type in the application for content of the third type matching with the keyword. In other words, the client device searches conversation records corresponding to the current account in the application for a conversation record matching with the keyword.

If the search navigation bar selected by the selection signal is the search navigation bar 433, and content of the fourth type corresponding to the search navigation bar 433 is collected content, the client device searches content of the fourth type in the application for content of the fourth type matching with the keyword. In other words, the client device searches collected content corresponding to the current account in the application for collected content matching with the keyword.

Step 309: Display content of the mth type matching with the keyword.

Figure 4C:
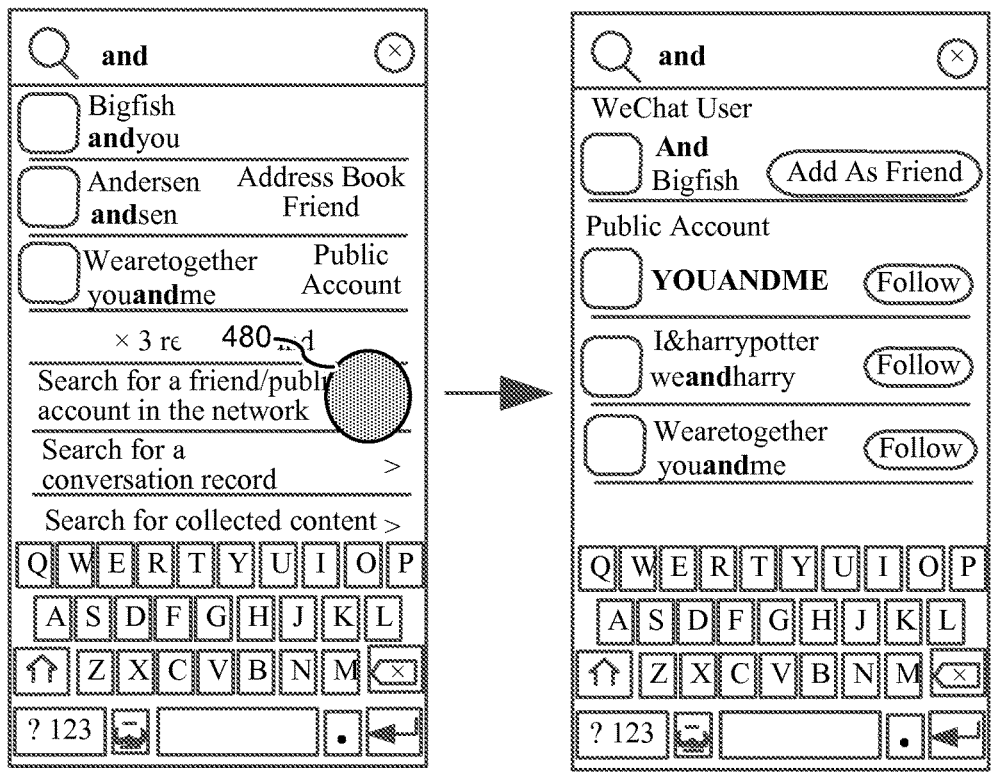
FIG. 4C is a schematic diagram of displaying friend/public accounts, in accordance with some embodiments.

When content of the mth type is searched according to the foregoing step, content of the mth type may be different, and therefore, this step has the following three cases:

In a first case, if content of the second type is searched in the foregoing step, referring to FIG. 4C, content of the second type is a personal account that has not been added as a friend and/or a public account that has not been followed, and the client device displays the content of the second type matching with the keyword. For example, as shown in the left-hand panel of FIG. 4C, the device receives a touch input 480 corresponding to search of content of the second type, resulting in the display of content of the second type matching the keyword in the right-hand panel of FIG. 4C.

In addition, after the client device displays a personal account exactly matching with the keyword and a public account roughly matching with the keyword, this step further includes, but is not limited to, the following three cases:

1) If a personal account exactly matching with the keyword is displayed, the client device receives a selection signal acting on the personal account, and adds the personal account selected by the selection signal as a friend.

2) If a public account roughly matching with the keyword is displayed, the client device receives a selection signal acting on the public account, and follows the public account selected by the selection signal.

Figure 4D:
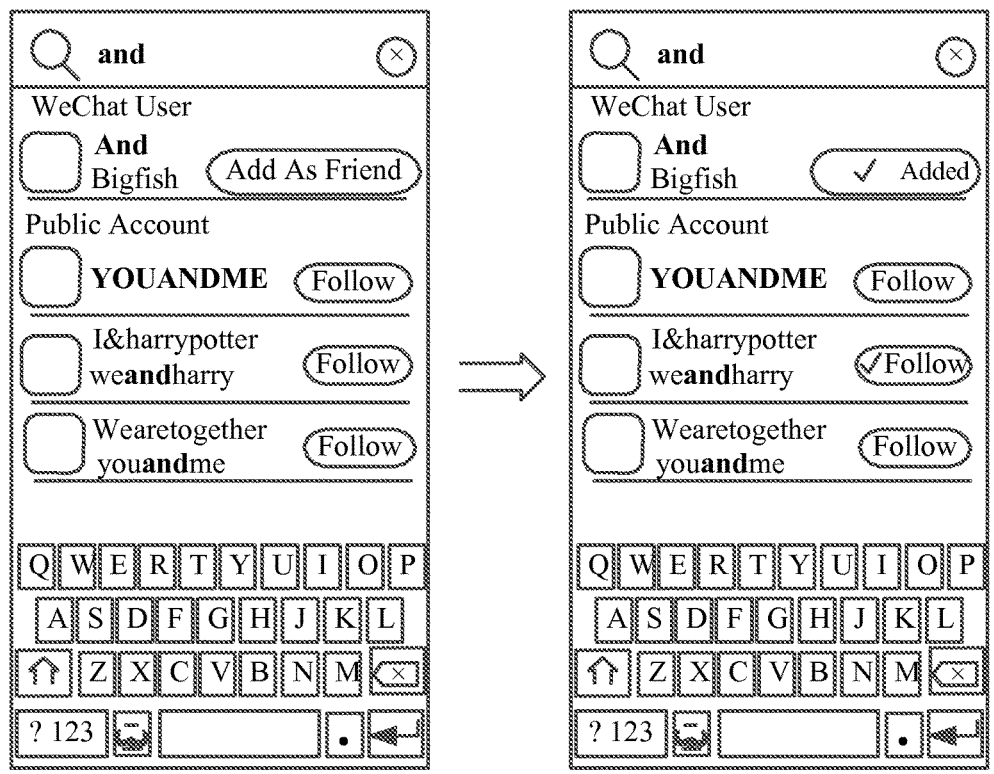
FIG. 4D is schematic diagram of adding a friend or following a public account, in accordance with some embodiments.

3) If a personal account exactly matching with the keyword and a public account roughly matching with the keyword are displayed, the client device may receive a selection signal acting on the personal account and may also receive a selection signal acting on the public account; may add the personal account selected by the selection signal as a friend and may also follow the public account selected by the selection signal, as shown in FIG. 4D. In some embodiments, when a personal or public account is added, a contact is downloaded to and stored on the client device. In such embodiments, the contact includes information such as the user's name, log-in name, avatar, address, other information, or a subset thereof, In a second case, if content of the third type is searched in the foregoing step, and referring to FIG. 4E, content of the third type is a conversation record, and the client device displays content of the third type matching with the keyword. For example, as shown in the left-hand panel of FIG. 4E, the device receives a touch input 482 corresponding to search of content of the third type, resulting in the display of content of the third type matching the keyword in the right-hand panel of FIG. 4E.

This step includes, but is not limited to, the following two manners:

1) Display conversation records matching with the keyword according to conversation groups.

For example, when an input keyword is "movie" and searched content is chat records, after all chat records with A have been displayed, chat records with B are displayed, and finally chat records with C are displayed.

Figure 4E:
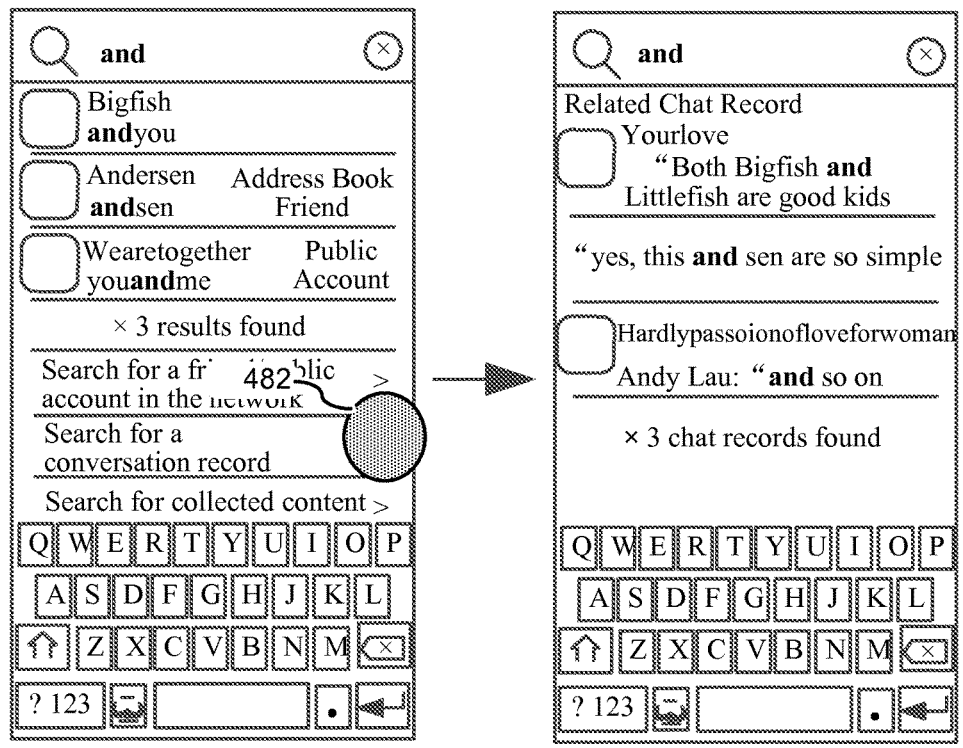
FIG. 4E is a schematic diagram of displaying conversation records, in accordance with some embodiments.
Figure 4F:
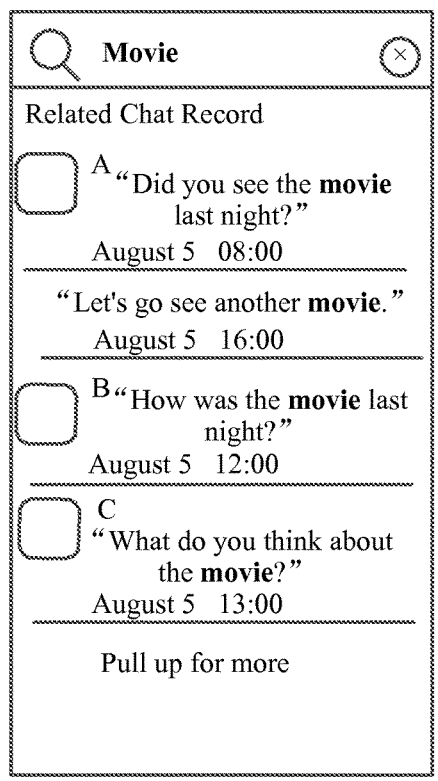
FIG. 4F is a schematic diagram of a conversation group displaying mode, in accordance with some embodiments.

For example, as shown in FIG. 4F, X has chatted with A, B, and C, and chat records with A, B, and C all have the keyword "movie". Chat records are displayed according to a conversation manner: First, content including the keyword in chat records with A is displayed; after the chat records with A have been displayed, content including the keyword in chat records with B is then displayed; finally, after the chat records with B have been displayed, content including the keyword in chat records with C is displayed.

2) Display conversation records matching with the keyword in an order of time.

Figure 4G:
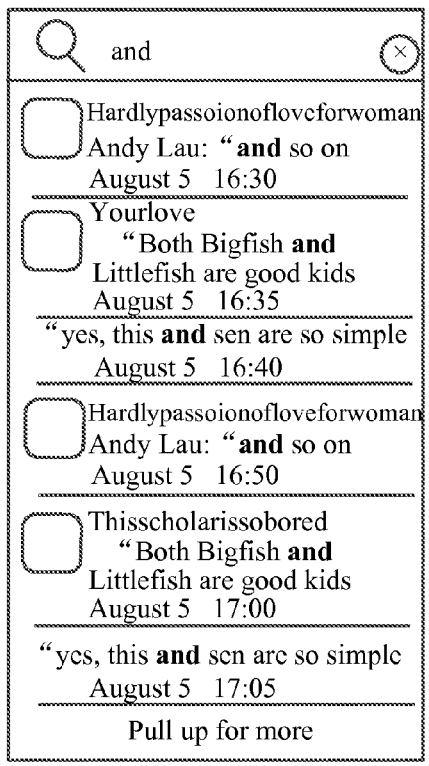
FIG. 4G is a schematic diagram of a time-order displaying mode, in accordance with some embodiments.

Content may be displayed in a record displaying order being a descending order of time or an ascending order of time. An option may further be added above or below displayed records: to display more results by pulling up for refreshing or to display more results by pulling down for refreshing. An example is shown in FIG. 4G.

Figure 4H:
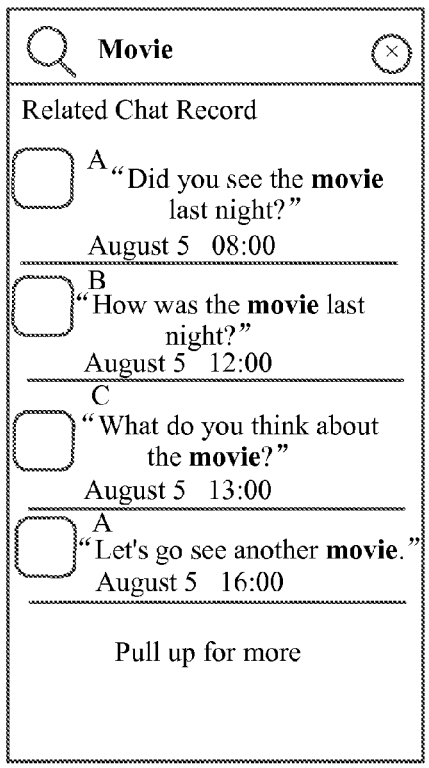
FIG. 4H is a schematic diagram of a time-order displaying mode, in accordance with some embodiments.

For example, as shown in FIG. 4H, X has chatted with A, B, and C, and chat records with A, B, and C all have the keyword "movie". A chat record "Did you see the movie last night?" between X and A was kept at 8:00, a chat record "How was the movie last night?" between X and B was kept at 12:00, a chat record "What do you think about the movie?" between X and C was kept at 13:00, and a chat record "Let's go see another movie." between X and A was kept at 16:00. If the chat records are displayed in an ascending order of time, the chat record "Did you see the movie last night?" between X and A is displayed as the first item, the chat record "How was the movie last night?" between X and B is displayed as the second item, the chat record "What do you think about the movie?" between X and C is displayed as the third item, and the chat record "Let's go see another movie." between X and A is displayed as the fourth item. In addition, time points of the chats may be displayed below these records.

Figure 4I:
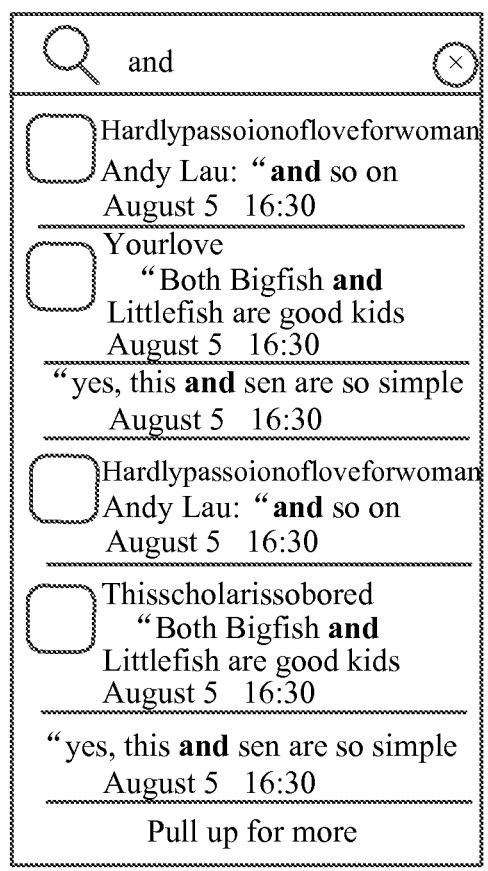
FIG. 4I is a schematic diagram of a threshold displaying mode, in accordance with some embodiments.
Figure 6:
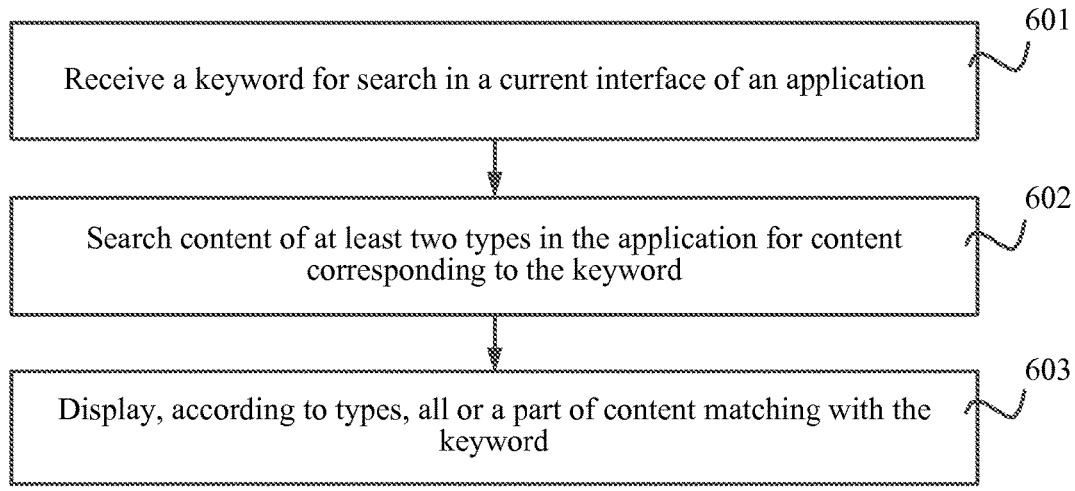
FIG. 6 is a method flowchart of a search method, in accordance with some embodiments.

Besides the foregoing two manners, the number of pieces of content corresponding to a threshold may further be displayed by default according to a preset threshold, for example, 6 or 20. As shown in FIG. 4I, 6 records are displayed.

In a third case, if content of the fourth type is searched in the foregoing step and content of the fourth type is collected content, the client device displays content of the fourth type matching with the keyword. The collected content may be displayed according to types of the collected content, or may also be displayed in an order of collecting time of the collected content, or may further be displayed according to precision of matching between collected content and the keyword.

In conclusion, in some embodiments of the search method, a keyword for search is received in a current interface of an application. Content of a first type in the application is searched for content of the first type matching with the keyword. The content of the first type matching with the keyword is displayed, and search navigation bars corresponding to content of other types except content of the first type are also displayed. The method solves the problem of time-consuming and inefficient search caused by switching between interfaces corresponding to content of different types in a search method in which content of different types needs to be searched in search boxes in different interfaces. Therefore, global search can be accomplished in only one search interface, thereby reducing the number of times of switching between search interfaces, saving search time, and improving search efficiency.

Figure 5:
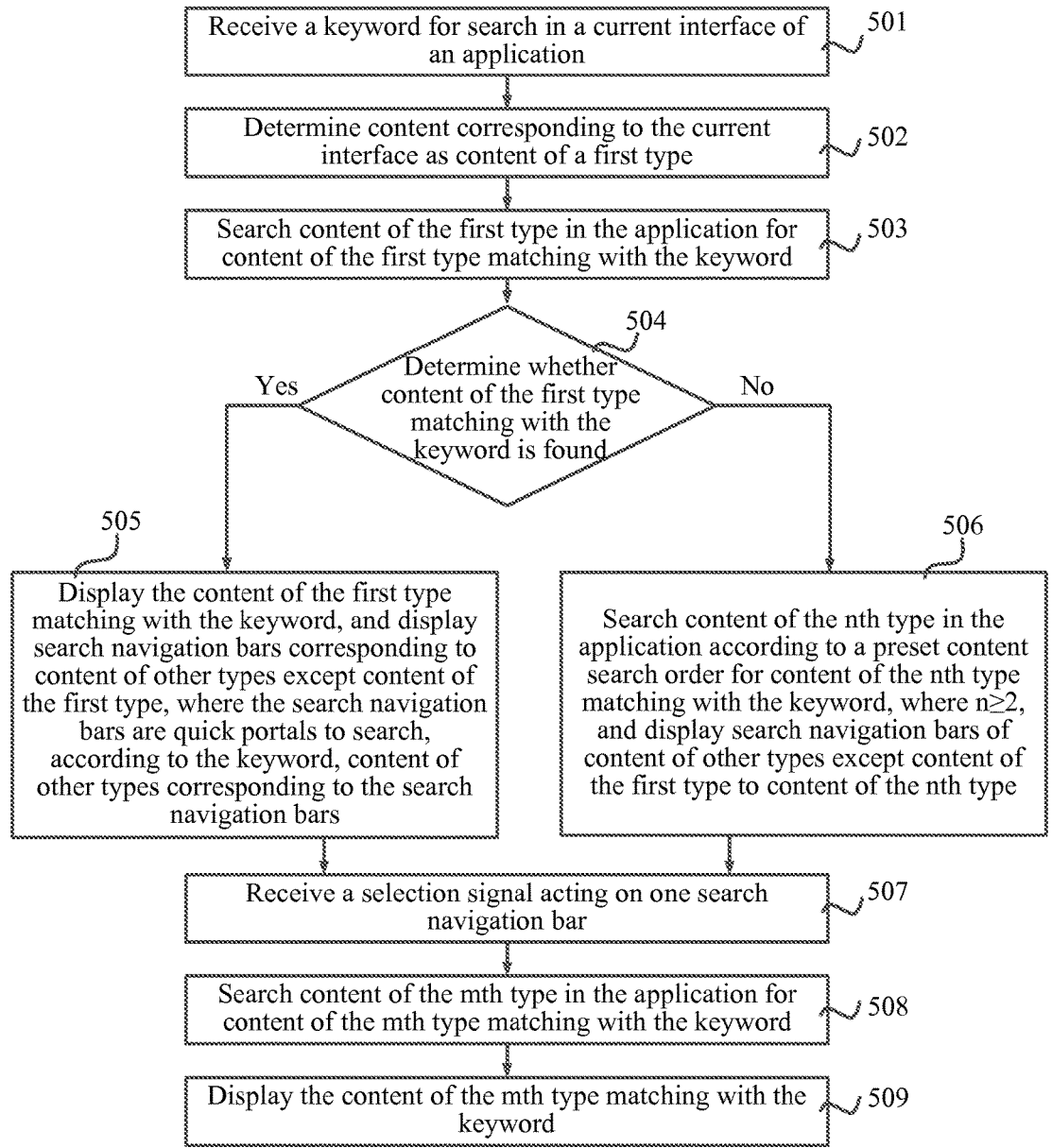
FIG. 5 is a method flowchart of a search method, in accordance with some embodiments.

FIG. 5 is a method flowchart of a search method, in accordance with some embodiments. The following example is used for description: the search method is applied to the client device shown in FIG. 1, an application is an instant messaging program, and content corresponding to a current interface is determined as content of a first type. The search method includes:

Step 501: Receive a keyword for search in a current interface of an application.

A client device receives the keyword for search in the current interface of the application. Specifically, the client device receives the keyword for search in a search input box in the current interface of the application.

The application being an instant messaging program is used as an example. The current interface may be an interface of a conversation record in the instant messaging program, an interface of collected content, an interface of an address book, or an interface of adding a friend.

The keyword may be one or more characters, one or more words, a combination of a character and a word, one or more numbers, where the numbers may indicate an account ID of a user in the instant messaging program, or one or more letters.

Step 502: Determine content corresponding to the current interface as content of a first type.

The application being an instant messaging program is used as an example. Content in the application generally has a personal account added as a friend and a followed public account, a personal account that has not been added as a friend and a public account that has not been followed, a conversation record, and collected content.

The client device determines content corresponding to the current interface as content of the first type, that is:

If the current interface is an interface corresponding to a conversation record, the client device determines content corresponding to a conversation record as content of the first type.

If the current interface is an interface corresponding to collected content, the client device determines content corresponding to collected content as content of the first type.

If the current interface is an interface corresponding to an address book, the client device determines content corresponding to a personal account added as a friend and a followed public account as content of the first type.

If the current interface is an interface corresponding to adding a friend, the client device determines content corresponding to a personal account that has not been added as a friend and a public account that has not been followed as content of the first type.

Next, the client device may determine content of the rest three types as content of a second type, content of a third type, and content of a fourth type. Specific determining methods may be different in embodiments.

Step 503: Search content of the first type in the application for content of the first type matching with the keyword.

The client device searches content of the first type corresponding to a current account in the application for content of the first type matching with the keyword. For example, the client device searches conversation records in the application for a conversation record matching with the keyword.

Step 504: Determine whether content of the first type matching with the keyword is found.

The client device determines whether content of the first type matching with the keyword is found in content corresponding to the current interface. If it is determined that content of the first type matching with the keyword is found, the process turns to Step 505.

If it is determined that content of the first type matching with the keyword is not found, the process turns to 506.

Step 505: Display the content of the first type matching with the keyword, and display search navigation bars corresponding to content of other types except content of the first type in the application.

Step 506: Search content of the nth type in the application according to a preset content search order for content of the nth type matching with the keyword, where n≥2, and display search navigation bars of content of other types except content of the first type to content of the nth type.

The preset content search order is set as: content of the first type, content of the second type, content of the third type, and content of the fourth type.

If a determination result is that content of the first type matching with the keyword is not found, the client device searches content of the second type for content of the second type matching with the keyword. When content of the second type matching with the keyword is found, the client device displays the content of the second type matching with the keyword, and displays at least one search navigation bar for content of another type except content of the first type and content of the second type, that is, displays search navigation bars corresponding to content of the third type and content of the fourth type.

When content of the second type matching with the keyword is not found either, the client device searches content of the third type for content of the third type matching with the keyword. When content of the third type matching with the keyword is found, the client device displays the content of the third type matching with the keyword, and displays at least one search navigation bar for content of another type except content of the first type to content of the third type, that is, displays a search navigation bar corresponding to content of the fourth type.

When content of the third type matching with the keyword is not found either, the client device searches content of the fourth type for content of the fourth type matching with the keyword. When content of the fourth type matching with the keyword is found, the client device displays the content of the fourth type matching with the keyword. Because there is no more content of other types, a search navigation bar is no longer displayed.

When content of the fourth type matching with the keyword is not found either, that is, the client device fails to find, in content of all types, content matching with the keyword, the client device displays prompt information that no search result is found.

Step 507: Receive a selection signal acting on one search navigation bar.

When a search navigation bar is displayed, the client device receives the selection signal acting on the search navigation bar. The selection signal is triggered by a user by clicking a search navigation bar when the user needs to search content in the search navigation bar.

Step 508: Search content of the mth type in the application for content of the mth type matching with the keyword.

The client device searches content of the mth type corresponding to the current account in the application for content of the mth type matching with the keyword, where content of the mth type is content of a type corresponding to a search navigation bar selected by the selection signal, and m≥2.

If content of the mth type is a personal account that has not been added as a friend and/or a public account that has not been followed, the client device searches content of the mth type in the application for content of the mth type matching with the keyword. The client device searches personal accounts that have not been added as friends corresponding to the current account in the application for a personal account exactly matching with the keyword, and searches public accounts that have not been followed corresponding to the current account in the application for a public account roughly matching with the keyword.

Step 509: Display content of the mth type matching with the keyword.

Search of content of the mth type and display of the same has already been described with reference to FIG. 3 and FIGS. 4A-4I. Any of the features and/or details described with reference to FIG. 3 and FIGS. 4A-4I may be shared by the search method described with reference to FIG. 5. Therefore, for the sake of brevity, such details are not repeated here.

In conclusion, in the search method provided in some embodiments, a keyword for search is received in a current interface of an application. Content of a first type in the application is searched for content of the first type matching with the keyword. The content of the first type matching with the keyword is displayed, and search navigation bars corresponding to content of other types except content of the first type are also displayed. The method solves the problem of time-consuming and inefficient search caused by switching between interfaces corresponding to content of different types in a search method in which content of different types needs to be searched in search boxes in different interfaces. Therefore, global search can be accomplished in only one search interface, thereby reducing the number of times of switching between search interfaces, saving search time, and improving search efficiency.

In addition, content corresponding to a current interface is determined as content of the first type; therefore, if content that a user needs to search for is the content corresponding to the current interface, the content is directly displayed in content of the first type. Therefore, it becomes convenient for a user to search for needed content, and search efficiency is improved.

FIG. 6 is a method flowchart of a search method, in accordance with some embodiments. The application of the search method to the client device shown in FIG. 1 is used as an example. The search method includes:

Step 601: Receive a keyword for search in a current interface of an application.

The application includes content of at least two types, and the current interface may be an interface corresponding to content of any type, for example, a first interface corresponding to content of a first type, a second interface corresponding to content of a second type, and a third interface corresponding to content of a third type.

Step 602: Search content of at least two types for content matching with the keyword.

The application being an instant messaging program is used as an example. Content of at least two types may be a personal account that has been added as a friend and a followed public account, a personal account that has not been added as a friend and a public account that has not been followed, a conversation record, collected content, and the like.

Step 603: Display, according to types, all or a part of content matching with the keyword.

A client device displays, according to types, all or a part of content matching with the keyword. Specifically, the client device displays, in a preset order, all or a part of content matching with the keyword in content of all types in a mixed manner. At least one piece of content is displayed for each type.

Figure 7:
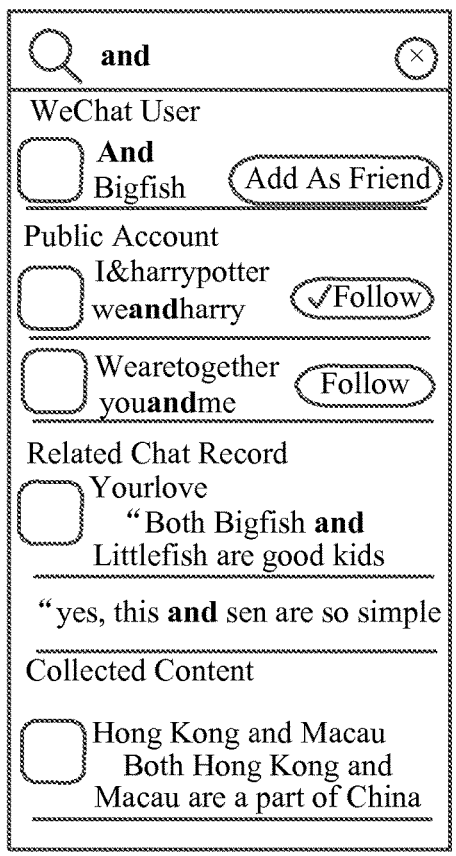
FIG. 7 is a schematic diagram of a hybrid search interface, in accordance with some embodiments.

Referring to FIG. 7, the application being an instant messaging program is used as an example. Content of a type, "WeChat User", matching with the keyword is displayed first. Next, content of another type, "Public Account", matching with the keyword, content of yet another type, "Related Chat Record", matching with the keyword, and content of still another type, "Collected Content", matching with the keyword are displayed successively.

In conclusion, in some embodiments of the search method, a keyword for search is received in a current interface of an application. Content of at least two types is searched for content matching with the keyword. All or a part of content matching with the keyword is displayed according to types. The method solves the problem of time-consuming and inefficient search caused by switching between interfaces corresponding to content of different types in a search method in which content of different types needs to be searched in search boxes in different interfaces. Therefore, global search can be accomplished in only one search interface, thereby reducing the number of times of switching between search interfaces, saving search time, and improving search efficiency.

Figure 8:
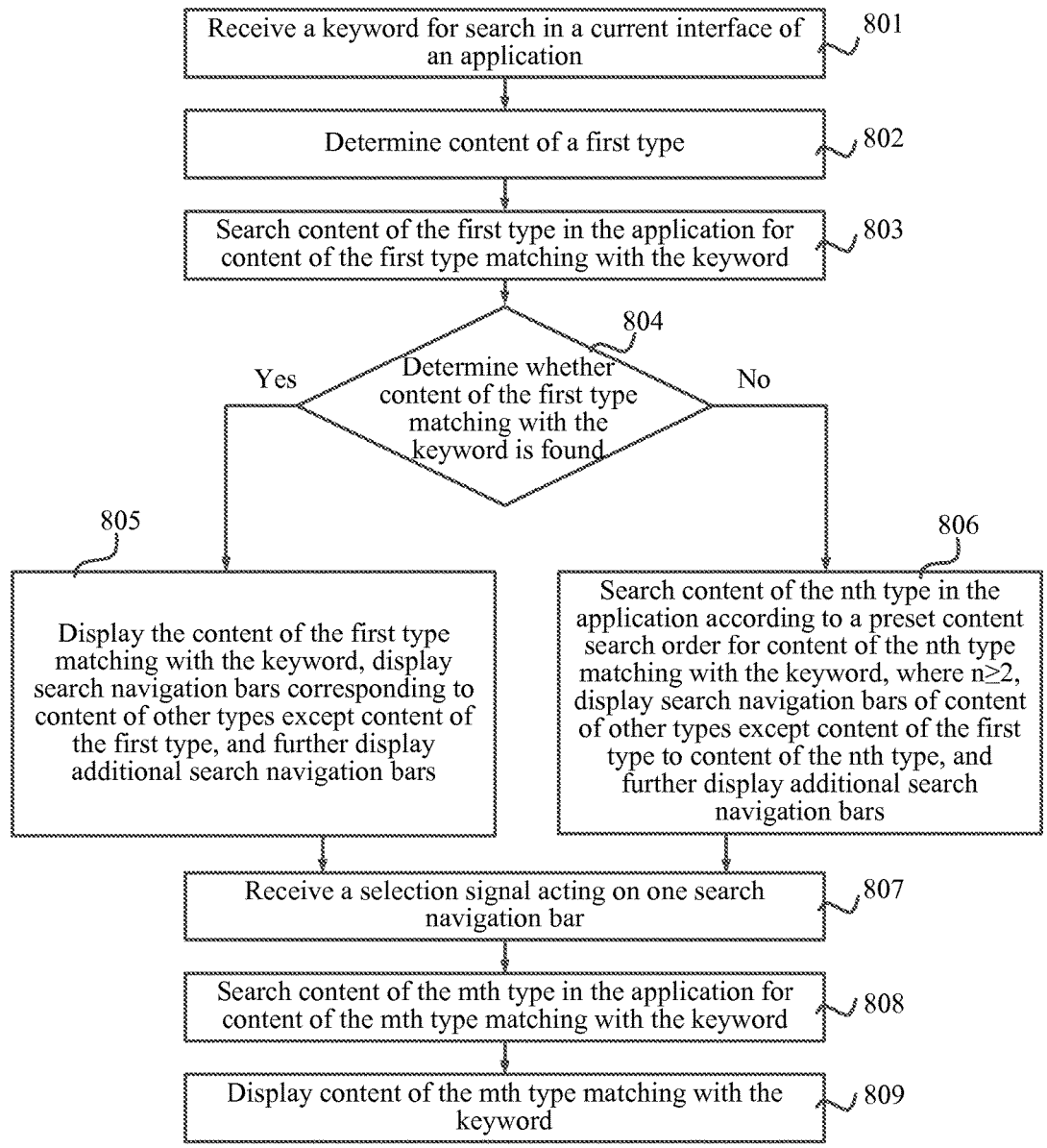
FIG. 8 is a method flowchart of a search method, in accordance with some embodiments.

FIG. 8 is a method flowchart of a search method, in accordance with some embodiments. The application of the search method to the client device shown in FIG. 1 is used as an example. The search method includes:

Step 801: Receive a keyword for search in a current interface of an application.

A client device receives the keyword for search in the current interface of the application. Specifically, the client device receives the keyword for search in a search input box in the current interface of the application.

The application being an instant messaging program is used as an example. The current interface may be an interface of a conversation record in the instant messaging program, an interface of collected content, an interface of an address book, or an interface of adding a friend.

The keyword may be one or more characters, one or more words, a combination of a character and a word, one or more numbers, where the numbers may indicate an account ID of a user in the instant messaging program, or one or more letters.

Step 802: Determine content of a first type.

In this step, the client device determines content of the first type in two manners: 1. determining content of a preset type as content of the first type; and 2. determining content corresponding to the current interface as content of the first type. The two methods are described in detail with reference to FIG. 3 and FIG. 5, respectively. For the sake of brevity, these details are not repeated here.

Step 803: Search content of the first type in the application for content of the first type matching with the keyword.

The client device searches content of the first type corresponding to a current account in the application for content of the first type matching with the keyword.

Step 804: Determine whether content of the first type matching with the keyword is found.

The client device determines whether content of the first type matching with the keyword is found in content corresponding to the current interface. If it is determined that content of the first type matching with the keyword is found, the process turns to Step 805.

If it is determined that content of the first type matching with the keyword is not found, the process turns to Step 806.

Step 805: Display the content of the first type matching with the keyword, display search navigation bars corresponding to content of other types except content of the first type, and further display additional search navigation bars.

Step 806: Search content of the nth type in the application according to a preset content search order for content of the nth type matching with the keyword, where n≥2, display search navigation bars of content of other types except content of the first type to content of the nth type, and display additional search navigation bars.

The preset content search order is set as: content of the first type, content of a second type, content of a third type, and content of a fourth type.

If a determination result is that content of the first type matching with the keyword is not found, the client device searches content of the second type for content of the second type matching with the keyword. When content of the second type matching with the keyword is found, the client device displays the content of the second type matching with the keyword, and displays at least one search navigation bar for content of another type except content of the first type and content of the second type, that is, displays search navigation bars corresponding to content of the third type and content of the fourth type.

When content of the second type matching with the keyword is not found either, the client device searches content of the third type for content of the third type matching with the keyword. When content of the third type matching with the keyword is found, the client device displays the content of the third type matching with the keyword, and displays at least one search navigation bar for content of another type except content of the first type to content of the third type, that is, displays a search navigation bar corresponding to content of the fourth type.

When content of the third type matching with the keyword is not found either, the client device searches content of the fourth type for content of the fourth type matching with the keyword. When content of the fourth type matching with the keyword is found, the client device displays the content of the fourth type matching with the keyword. Because there is no more content of other types, a search navigation bar is no longer displayed.

When content of the fourth type matching with the keyword is not found either, that is, the client device fails to find, in content of all types, content matching with the keyword, the client device displays prompt information that no search result is found.

It should be further noted that if there are two or more search navigation bars, manners of displaying search navigation bars corresponding to content of other types except content of the first type include, but are not limited to, the following three types:

1) Sort search navigation bars according to latest use time of content of other types corresponding to the search navigation bars, and display the search navigation bars.

Figure 9A:
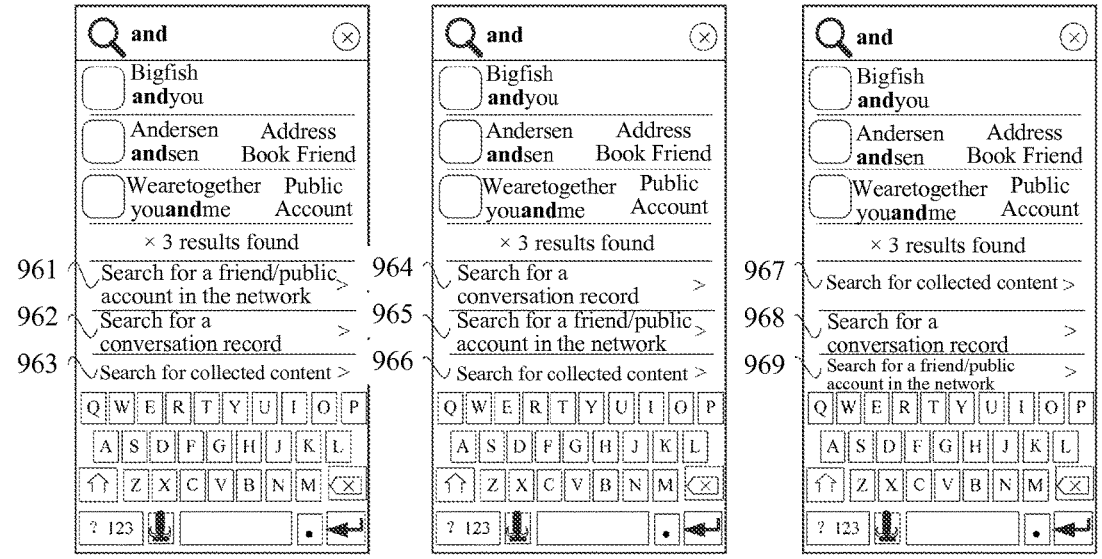
FIG. 9A is a schematic diagram of a sorting mode of search navigation bars, in accordance with some embodiments.

For example, as shown in the first picture of FIG. 9A, if, after a keyword "and" is input, the client device detects that content of the most recent search is a personal account that has not been added as a friend and a public account that has not been followed, content of the second most recent search is a conversation record, and content of the third most recent search is collected content, a search navigation bar 961, "Search for a friend/public account in the network", for a personal account that has not been added as a friend and a public account that has not been followed, a search navigation bar 962, "Search for a conversation record", and a search navigation bar 963, "Search for collected content", are successively displayed.

As shown in the second picture of FIG. 9A, if, after the keyword "and" is input, the client device detects that content of the most recent search is a conversation record, content of the second most recent search is a personal account that has not been added as a friend and a public account that has not been followed, and content of the third most recent search is collected content, a search navigation bar 964, "Search for a conversation record", a search navigation bar 965, "Search for a friend/public account in the network", and a search navigation bar 966, "Search for collected content", are successively displayed.

As shown in the third picture of FIG. 9A, if, after the keyword "and" is input, the client device detects that content of the most recent search is collected content, content of the second most recent search is a conversation record, and content that of the third most recent search is a personal account that has not been added as a friend and a public account that has not been followed, a search navigation bar 967, "Search for collected content", a search navigation bar 968, "Search for a conversation record", and a search navigation bar 969, "Search for a friend/public account in the network", are successively displayed.

2) Sort search navigation bars according to history search frequencies of content of other types corresponding to the search navigation bars, and display the search navigation bars.

Figure 9B:
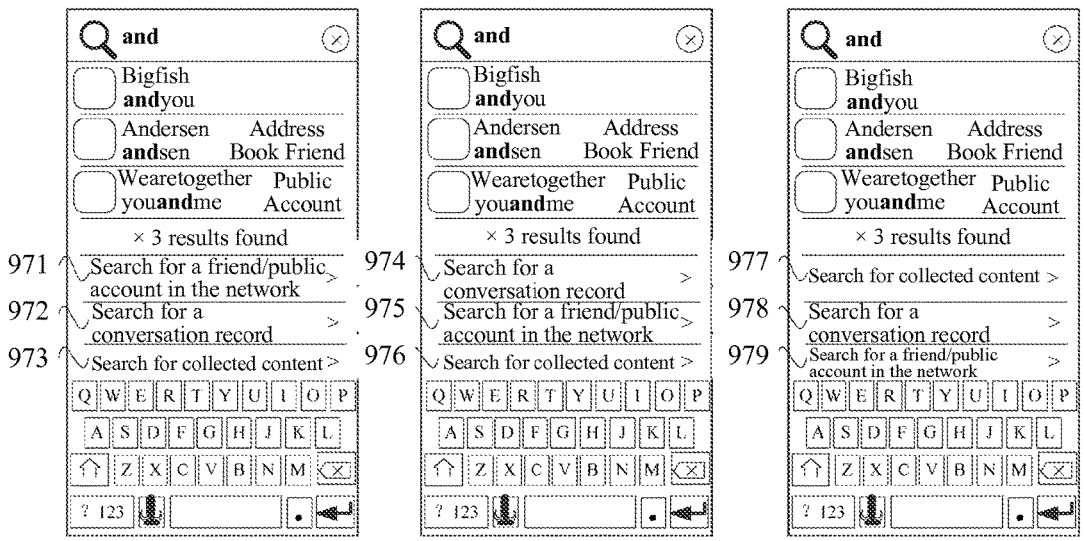
FIG. 9B is a schematic diagram of another sorting mode of search navigation bars, in accordance with some embodiments.

For example, as shown in the first picture of FIG. 9B, if content of the most frequent search by a user is a personal account that has not been added as a friend and a public account that has not been followed, content of the second most frequent search is a conversation record, and content of the third most frequent search is collected content, a search navigation bar 971, "Search for a friend/public account in the network", a search navigation bar 972, "Search for a conversation record", and a search navigation bar 973, "Search for collected content", are successively displayed.

As shown in the second picture of FIG. 9B, if content of the most frequent search by the user is a conversation record, content of the second most frequent search is a personal account that has not been added as a friend and a public account that has not been followed, and content of the third most frequent search is collected content, a search navigation bar 974, "Search for a conversation record", a search navigation bar 975, "Search for a friend/public account in the network", and a search navigation bar 976, "Search for collected content", are successively displayed.

As shown in the third picture of FIG. 9B, if content of the most frequent search by the user is collected content, content of the second most frequent search is a conversation record, and content of the third most frequent search is a personal account that has not been added as a friend and a public account that has not been followed, a search navigation bar 977, "search for collected content", a search navigation bar 978, "Search for a conversation record", and a search navigation bar 979, "Search for a friend/public account in the network", are successively displayed.

3) Sort search navigation bars according to preset priorities of content of other types corresponding to the search navigation bars, and display the search navigation bars. Stated another way, in some embodiments, the search navigation bars are sorted according to the predefined search type hierarchy thus establishing a search priority.

The priority of a personal account that has not been added as a friend and a public account that has not been followed may be set to be the highest, the priority of a conversation record is set to be the second highest, and the priority of collected content is set to be the third highest. A search navigation bar corresponding to the highest priority, a search navigation bar corresponding to the second highest priority, and a search navigation bar corresponding to the third highest priority are displayed successively. The ranking of search priorities (e.g., the ranking in the predefined search type hierarchy) may be established in any number of ways. The rankings (e.g., priorities) described above are merely examples of top search priorities, and are thus not intended to limit that scope of the claims that follow.

Besides, when displaying the search navigation bars corresponding to content of other types except content of the first type, the client device further displays additional search navigation bars.

The additional search navigation bars are quick portals to search other information sources except the application according to a keyword. The other information sources may be other applications, other search engines, or various types of websites. Manners of displaying the additional search navigation bars include, but are not limited to, two types: 1. There is only one navigation portal, for example, "Search other information sources" or "Search more content"; when a user clicks the additional search navigation bar, a current interface directly jumps to an interface with multiple information sources, the interface includes many other applications, search engines, and website addresses, and the user may select at least one type in the interface to perform search. 2. Display at least one additional search navigation bar, where the at least one additional search navigation bar is displayed in a preset order or not in a preset order. For example, an additional search navigation bar "Go search in Cdu", an additional search navigation bar "Go search in a T knowledge base", an additional search navigation bar "Go search in an FB transaction platform", and the like, are successively displayed. If there are many additional search navigation bars, an option similar to "Pull down for more" may be provided.

Figure 9C:
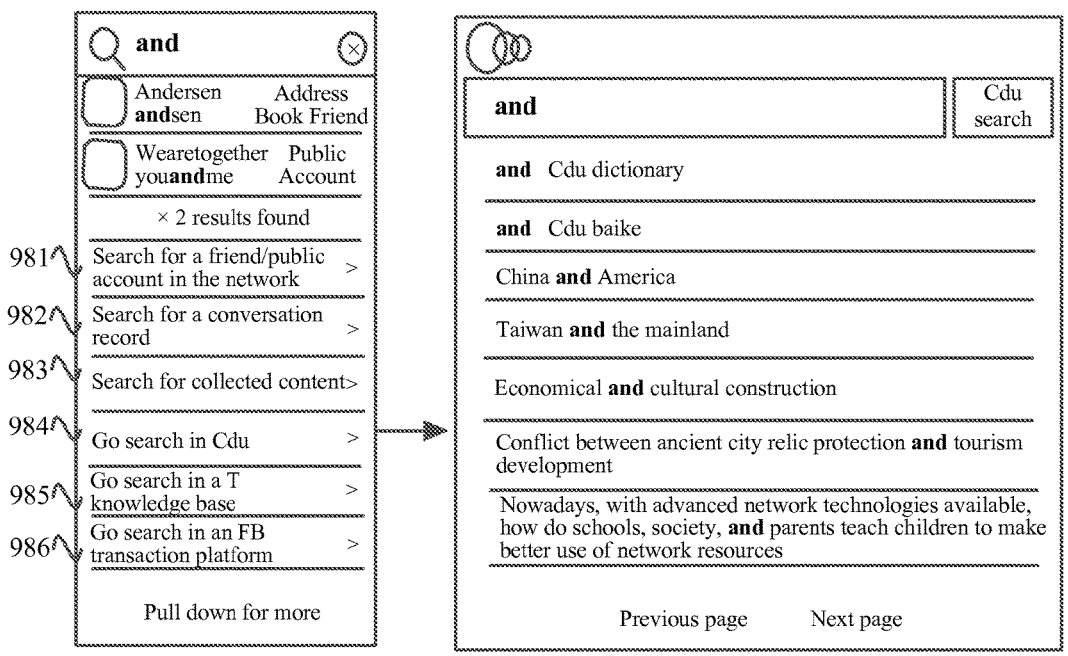
FIG. 9C is a schematic diagram of additional search navigation bars, in accordance with some embodiments.

For example, as shown in FIG. 9C, besides displaying a search navigation bar 981 "Search for a friend/public account in the network", a search navigation bar 982 "Search for a conversation record", and a search navigation bar 983 "Search for collected content", a search navigation bar 984 "Go search in Cdu" is further displayed. The search navigation bar 984 is an additional search navigation bar, and an additional search navigation bar 985, "Go search in a T knowledge base", and an additional search navigation bar 986, "Go search in an FB transaction platform", are further displayed. Search may be performed in other information sources according to the keyword by using the search navigation bar 984. Click the additional search navigation bar 984 to enter a Cdu search engine.

Step 807: Receive a selection signal acting on one search navigation bar.

When a search navigation bar is displayed, the client device receives the selection signal acting on the search navigation bar. The selection signal is triggered by the user by clicking a search navigation bar when the user needs to search content in the search navigation bar.

Step 808: Search content of the mth type in the application for content of the mth type matching with the keyword.

The client device searches content of the mth type corresponding to the current account in the application for content of the mth type matching with the keyword, where content of the mth type is content of a type corresponding to a search navigation bar selected by the selection signal, and m≥2.

If content of the mth type is a personal account that has not been added as a friend and/or a public account that has not been followed, the client device searches content of the mth type in the application for content of the mth type matching with the keyword. In other words, the client device searches personal accounts that have not been added as friends corresponding to the current account in the application for a personal account exactly matching with the keyword, and searches public accounts that have not been followed corresponding to the current account in the application for a public account roughly matching with the keyword.

Step 809: Display the content of the mth type matching with the keyword.

Search of content of the mth type and display of the same has already been described with reference to FIG. 3 and FIGS. 4A-4I. Any of the features and/or details described with reference to FIG. 3 and FIGS. 4A-4I may be shared by the search method described with reference to FIG. 5. Therefore, for the sake of brevity, such details are not repeated here.

In conclusion, in some embodiments of the search method, a keyword for search is received in a current interface of an application. Content of a first type in the application is searched for content of the first type matching with the keyword. The content of the first type matching with the keyword is displayed, and search navigation bars corresponding to content of other types except content of the first type are also displayed. The method solves the problem of time-consuming and inefficient search caused by switching between interfaces corresponding to content of different types in a search method in which content of different types needs to be searched in search boxes in different interfaces. Therefore, global search can be accomplished in only one search interface, thereby reducing the number of times of switching between search interfaces, saving search time, and improving search efficiency.

It should be further noted that with the additional search navigation bars, if failing to find needed content in a current application, a user may search other information sources for the needed content by using the additional search navigation bars without needing to specifically open other applications and search engines using other approaches. Therefore, a search speed is improved, and search becomes less complicated.

Apparatus embodiments of the present disclosure are provided in the following. Where appropriate, reference is made to the foregoing method descriptions for details that are not repeated here.

Figure 10:
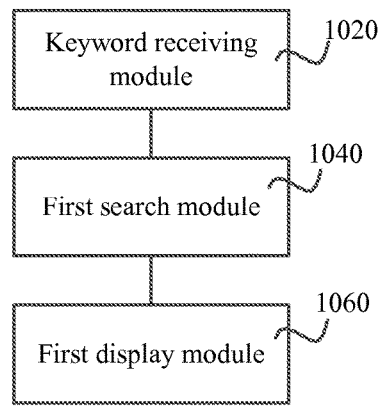
FIG. 10 is a schematic structural diagram of a search apparatus, in accordance with some embodiments.

FIG. 10 is a schematic structural diagram of a search apparatus, in accordance with some embodiments. The search apparatus may be implemented as the whole or a part of an electronic device by using software, hardware, or a combination of both. The search apparatus may include: a keyword receiving module 1020, a first search module 1040, and a first display module 1060.

The keyword receiving module 1020 is used to receive a keyword for search in a current interface of an application.

The first search module 1040 is used to search content of a first type in the application for content of the first type matching with the keyword received by the keyword receiving module 1020.

The first display module 1060 is used to display the content, of the first type matching with the keyword, found by the first search module 1040, and display search navigation bars corresponding to content of other types except content of the first type, where the search navigation bars are quick portals to search, according to the keyword, content of other types corresponding to the search navigation bars.

In conclusion, in some embodiments, the search apparatus receives a keyword for search in a current interface of an application. The search apparatus searches content of a first type in the application for content of the first type matching with the keyword. The search apparatus displays the content of the first type matching with the keyword, and displays search navigation bars corresponding to content of other types except content of the first type. The search apparatus solves the problem of time-consuming and inefficient search caused by switching between interfaces corresponding to content of different types in a search method in which content of different types needs to be searched in search boxes in different interfaces. Therefore, global search can be accomplished in only one search interface, thereby reducing the number of times of switching between search interfaces, saving search time, and improving search efficiency.

Figure 11:
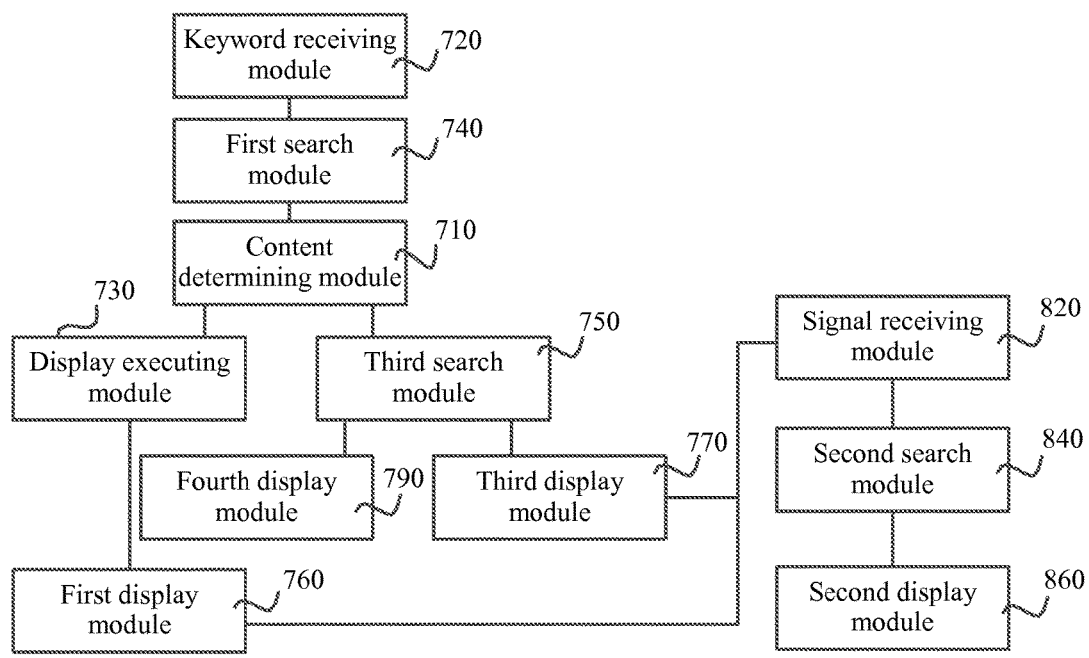
FIG. 11 is a schematic structural diagram of a search apparatus, in accordance with some embodiments.

FIG. 11 is a schematic structural diagram of a search apparatus, in accordance with some embodiments. The search apparatus may be implemented as the whole or a part of an electronic device by using software, hardware, or a combination of both. The search apparatus may include: a keyword receiving module 1020, a first search module 1040, and a first display module 1060.

The keyword receiving module 1020 is used to receive a keyword for search in a current interface of an application. The first search module 1040 is used to search content of a first type in the application for content of the first type matching with the keyword received by the keyword receiving module 1020.

The first display module 1060 is used to display the content, of the first type matching with the keyword, found by the first search module 1040, and display search navigation bars corresponding to content of other types except content of the first type, where the search navigation bars are quick portals to search, according to the keyword, content of other types corresponding to the search navigation bars.

Preferably, the search apparatus further includes: a signal receiving module 820, a second search module 840, and a second display module 860.

The signal receiving module 820 is used to receive a selection signal acting on one search navigation bar.

The second search module 840 is used to search content of the mth type in the application for content of the mth type matching with the keyword in a search navigation bar corresponding to the selection signal received by the signal receiving module 820, where content of the mth type is content of a type corresponding to a search navigation bar selected by the selection signal, and m≥2.

The second display module 860 is used to display the content, of the mth type matching with the keyword, found by the second search module 840.

Preferably, if content of the mth type is a conversation record, the second display module 860 includes: a group display unit or a sequential display unit.

The group display unit is used to display conversation records matching with the keyword according to conversation groups.

The sequential display unit is used to display conversation records matching with the keyword in an order of time.

Preferably, if content of the mth type is a personal account that has not been added as a friend and/or a public account that has not been followed, the second search module 840 includes a first search unit and/or a second search unit.

The first search unit is used to search personal accounts that have not been added as friends in the application for a personal account exactly matching with the keyword.

The second search unit is used to search public accounts that have not been followed in the application for a public account roughly matching with the keyword.

Preferably, the second display module 860 includes an account display unit.

The account display unit is used to display the personal account exactly matching with the keyword and/or the public account roughly matching with the keyword.

Preferably, the search apparatus further includes: an account adding module and an account following module.

The account adding module is used to: if a personal account exactly matching with the keyword is displayed, receive a selection signal acting on the personal account, and add the personal account selected by the selection signal as a friend.

The account focusing module is used to: if a public account roughly matching with the keyword is displayed, receive a selection signal acting on the public account, and follow the public account selected by the selection signal.

Preferably, the search apparatus further includes a content presetting module or a content determining module.

The content presetting module is used to determine content of a preset type as content of the first type.

The content determining module is used to determine content corresponding to a current interface as content of the first type.

Preferably, the search apparatus further includes: a content determining module 710, a display executing module 730, a third search module 750, a third display module 770, and a fourth display module 790.

The content determining module 710 is used to determine whether the first search module 1040 finds content of the first type matching with the keyword.

The display executing module 730 is used to: if a determination result of the content determining module 710 is that content of the first type matching with the keyword is found, execute the step of displaying the content of the first type matching with the keyword.

The third search module 750 is used to: if a determination result of the content determining module 710 is that content of the first type matching with the keyword is not found, search content of the nth type in the application according to a preset content search order for content of the nth type matching with the keyword, where n≥2.

The third display module 770 is used to: when the third search module 750 finds content of the nth type matching with the keyword, display the content of the nth type matching with the keyword, and display search navigation bars of content of other types except content of the first type to content of the nth type.

The fourth display module 790 is used to: when the third search module 750 fails to find content matching with the keyword in content of all types, display prompt information that there is no search result.

Preferably, if there are two or more search navigation bars, the first display module 1060 further includes: a first display unit, a second display unit, or a third display unit.

The first display unit is used to sort search navigation bars according to latest use time of content of other types corresponding to the search navigation bars, and display the search navigation bars.

The second display unit is used to sort search navigation bars according to history search frequencies of content of other types corresponding to the search navigation bars, and display the search navigation bars.

The third display unit is used to sort search navigation bars according to preset priorities of content of other types corresponding to the search navigation bars, and display the search navigation bars.

Preferably, the search apparatus further includes: a fourth display unit.

The fourth display unit is used to: when the search navigation bars corresponding to content of other types except content of the first type are displayed, further display additional search navigation bars, where the additional search navigation bars are quick portals to search other information sources except the application according to a keyword.

In conclusion, in some embodiments, the search apparatus receives a keyword for search in a current interface of an application. The search apparatus searches content of a first type in the application for content of the first type matching with the keyword. The search apparatus displays the content of the first type matching with the keyword, and displays search navigation bars corresponding to content of other types except content of the first type. The search apparatus solves the problem of time-consuming and inefficient search caused by switching between interfaces corresponding to content of different types in a search method in which content of different types needs to be searched in search boxes in different interfaces. Therefore, global search can be accomplished in only one search interface, thereby reducing the number of times of switching between search interfaces, saving search time, and improving search efficiency.

Figure 12A:
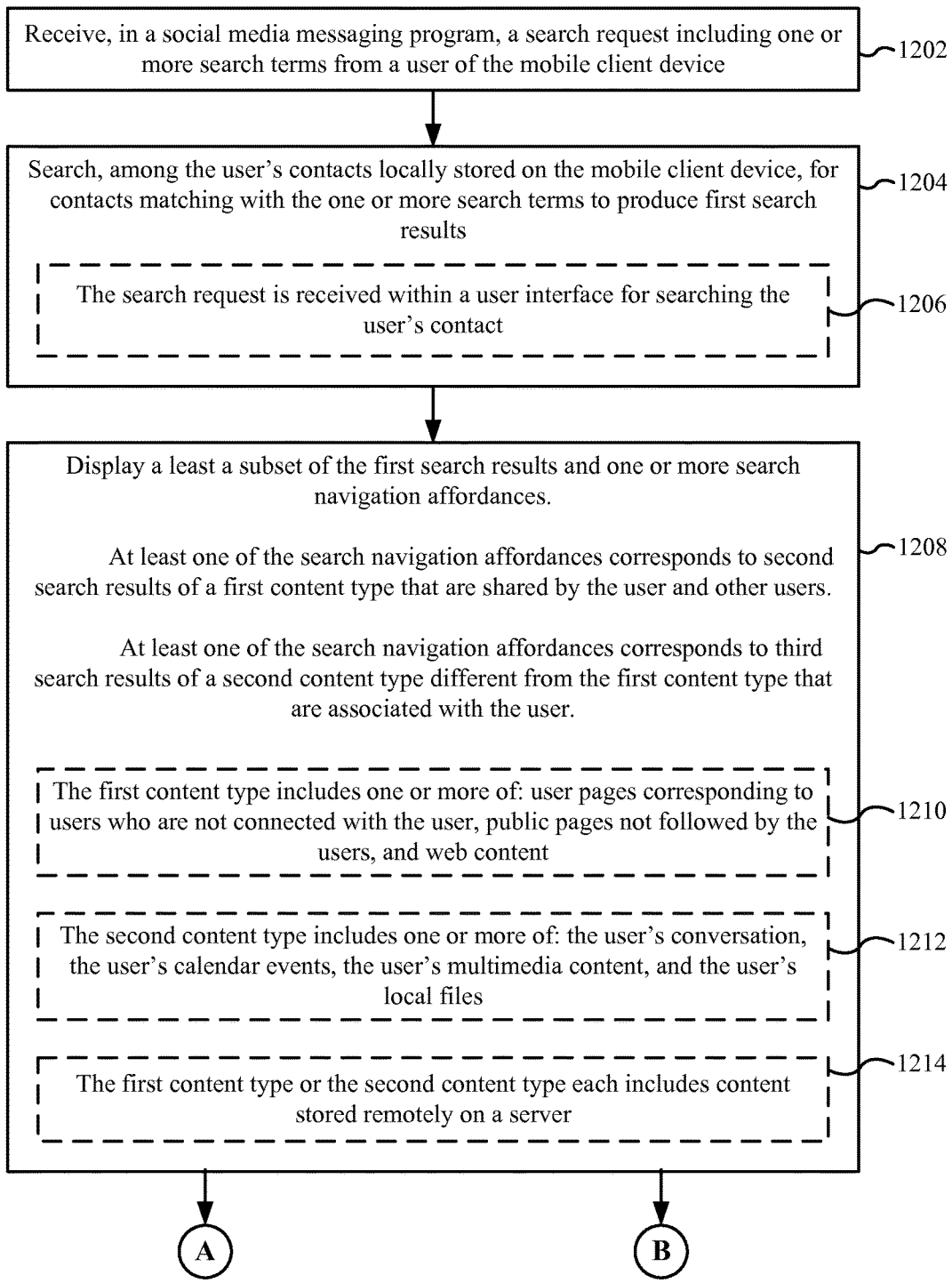
FIGS. 12A-12B are a flowchart illustrating a method of search, in accordance with some embodiments.
Figure 12B:
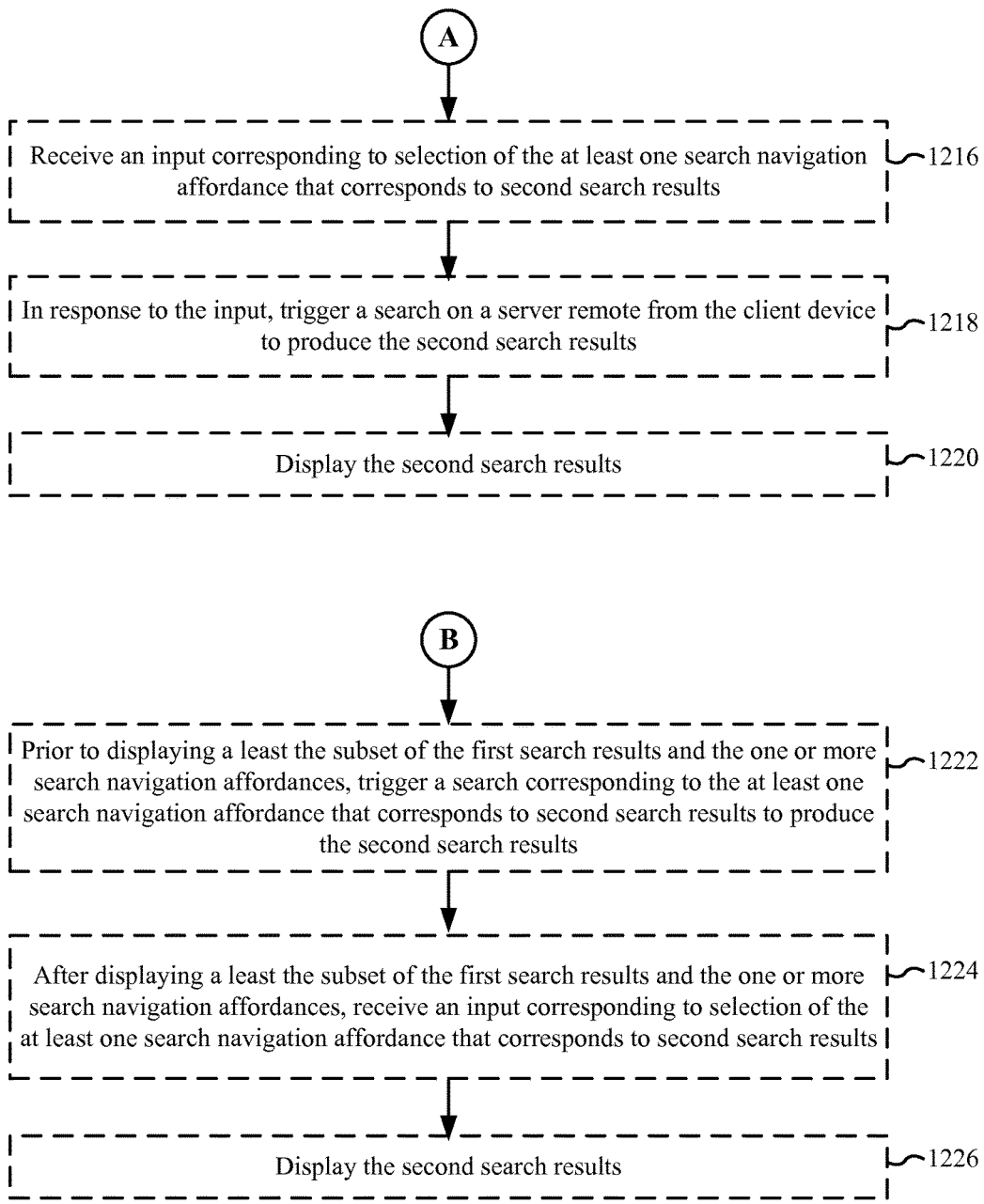

FIGS. 12A-12B include a flow chart of a method 1200 of search, in accordance with some implementations. In various implementations, some operations in of method 1200 may be combined and/or the order of some operations may be changed from the order shown in the figures. Also, in some implementations, operations shown in separate figures (e.g., FIGS. 13A-13B) and/or discussed in association with separate methods (e.g., method 1300) may be combined to form other methods, and operations shown in the same figure and/or discussed in association with the same method may be separated into different methods.

In some implementations, one or more operations in method 1200 are performed at a client device (e.g., a mobile client device, such as client device 1408/1410, as described with reference to FIG. 14 and/or FIG. 15). In some embodiments, one or more operations in method 1200 are performed by a social network server system (e.g., server system 1411, as described with reference to FIG. 14 and/or FIG. 16). For ease of explanation, the entirety of method 1200 is described as being performed by a client device (e.g., a mobile client device).

The client device receives (1202), in a social media messaging program, a search request including one or more search terms (also called "keywords" or "input keywords") from a user of the mobile client device. For example, as shown in FIGS. 4A-4B, a user enters one or more search terms (e.g., the word "and") into a current user interface of a social media messaging program. In various embodiments, the client device receives the search request from the user in any number of ways, for example: using a touchpad keyboard displayed with the current user interface on the mobile client device, with a speech input user interface (e.g., activated by speech input button 400, FIG. 4A), a physical keyboard, or in other manners.

In some embodiments, the social media messaging program is a mobile application (known as a "mobile app" or simply an "app") that allows users (e.g., people) to connect with one another, chat, share content and interests, and so on. In some embodiments, when a first user is connected with second user, the second user is said to be the first user's "friend"; "contact"; "connection"; and/or "follower". In some embodiments, information corresponding to the second user is stored locally on the first user's client device (e.g., in memory 1506, FIG. 15). Such information option includes one or more of: the second user's log-in name (also sometimes called a "screen name"; "user name"; "nickname"; and/or "handle"); e-mail address; phone number; avatar; and/or other personal information. In this sense, the user's contacts are stored locally on the user's mobile client device.

The client device searches (1204), among the user's contacts locally stored on the mobile client device, for contacts matching with the one or more search terms to produce first search results. In particular, as shown in FIGS. 4A-4B, in some embodiments, the search request is received within (1206) a user interface for searching the user's contact (e.g., the current user interface is a user interface for searching the user's contacts). In some embodiments, a contact matches the one or more search terms when the one or more search terms appear (e.g., as a string) within the user's log-in name. For example, as shown in FIG. 4B, one of the user's contact has a display name "Bigfish" and a log-in name "andyou." Because the string "and" appears in the contact's log-in name, the contact matches the search request. In some embodiments, a contact matches the one or more search terms when the one or more search terms appear anywhere within the contact's information stored locally on the user's mobile client device. For example, if andyou lived on "Hamilton Street," and andyou's street address is stored locally in the user's mobile client device, a search of "Ham" will also, in accordance with some embodiments, result in a determination that andyou is a match for the search request.

In some embodiments, as explained in greater detail below (with reference to method 1300, FIGS. 13A-13B), the user interface is an interface for searching the user's contacts. However, in the spirit of providing a global search functionality in which searches for different types of subject matter are at the user's finger tips, in some embodiments, search navigation affordances are provided in the user for other searches that are not directly related to the user's contacts (e.g., search for a conversation record 432, FIG. 4B).

To that end, the client device displays (1208) a least a subset of the first search results and one or more search navigation affordances. In some embodiments, at most, the client device displays a maximum predefined number of the first search results (e.g., the user's contacts). For example, in some embodiments, at most three (or five, or six) of the matching first search results are shown, while access to the remaining first search results is provided via a search navigation affordance. As used herein, the term "displayed" should be construed to mean that the a least a subset of the first search results and the one or more search navigation affordances are provided on the same user interface, even if they are not simultaneously visible on the user's device (e.g., the user has to scroll down in a window displaying the user interface in order to see some or all of the one or more search navigation affordances).

In addition, at least one of the search navigation affordances corresponds to second search results of a first content type that are shared by the user and other users. In various embodiments, the first content type includes (1210) one or more of: user pages corresponding to users who are not connected with the user, public pages not followed by the users, and web content. For example, FIG. 4B illustrates a search navigation bar 431 (e.g., an example of a search navigation affordance) for searching for friends/public accounts in the network. In other words, this search navigation affordance provides a search (as explained in greater detail below) for user's who are not yet friends, so that the user can "friend" other users (e.g., add other users as contacts), and also searches for public pages so that a user can "follow" the public pages. Since these potential contacts/potential public pages to follow are not yet associated with the user, they are examples of a type of content that is shared by the user and other users.

At least one of the search navigation affordances corresponds to third search results of a second content type different from the first content type that are associated with the user. In various embodiments, the second content type includes (1212) one or more of: the user's conversation, the user's calendar events, the user's multimedia content, and the user's local files. For example, FIG. 4B illustrates a search navigation bar 432 (e.g., an example of a search navigation affordance) for searching for a conversation record. Stated another way, in some embodiments, the second content type includes some or all of the user's "private" content (e.g., which, in the case of conversations, may be shared between the user and a small number of other users). As shown in FIG. 4E, when a user input is received corresponding to selection of search navigation bar 432, the client device displays matching conversations (e.g., headers, or portions of conversations).

In some embodiments, the first content type or the second content type each includes content stored remotely on a server. For example, in some embodiments, the user's conversation records are stored on the server (e.g., on the "cloud"). Generally speaking, a search for new friends/public pages to follow involves as server search as well. That is to say, in some embodiments, method 1200 is a method of "mixed" search that involves both a local search (e.g., for the user's contacts stored locally on the user's client device) as well as search for content on a server.

As described below, method 1200 includes two optional manners with which to perform an additional search (e.g., a search for the second search results or the third search results). In some embodiments, as encapsulated in operations 1216-1220, an additional search is triggered (e.g., at a server system) by selection of a corresponding search navigation affordance. Alternatively, in some embodiments, as encapsulated in operations 1222-1226, the additional search or searches are performed prior to displaying the search navigation affordances and are displayed when a search navigation affordance is selected (e.g., without the need for additional searching upon the selection).

In the first manner, the client device optionally receives (1216) an input corresponding to selection of the at least one search navigation affordance that corresponds to second search results (e.g., touch input 480, FIG. 4C). In response to the input, the client device triggers (1218) a search on a server remote from the client device to produce the second search results. The client device then displays (1220) the second search results. This manner of search is advantageous because it helps to limit the amount of searching to searching that is actually of interest to the user, and thus increases the speed of the search.

In the second manner, prior to displaying a least the subset of the first search results and the one or more search navigation affordances, the device triggers (1222) a search corresponding to the at least one search navigation affordance that corresponds to second search results to produce the second search results. For example, in some embodiments, a prior to the display of the user interface shown in FIG. 4B, a search has already been performed for each of search navigation button 431, search navigation button 432, and search navigation button 433. The results, or at least a portion of the results (e.g., headers and/or other summarizing information), are stored in memory on the client device. After displaying a least the subset of the first search results and the one or more search navigation affordances, the client device receives (1224) an input corresponding to selection of the at least one search navigation affordance that corresponds to second search results (e.g., touch input 480, FIG. 4C). The device displays the second search results. This manner of search is advantageous because it increases the speed of response upon selection of a search navigation affordance.

Figure 13B:
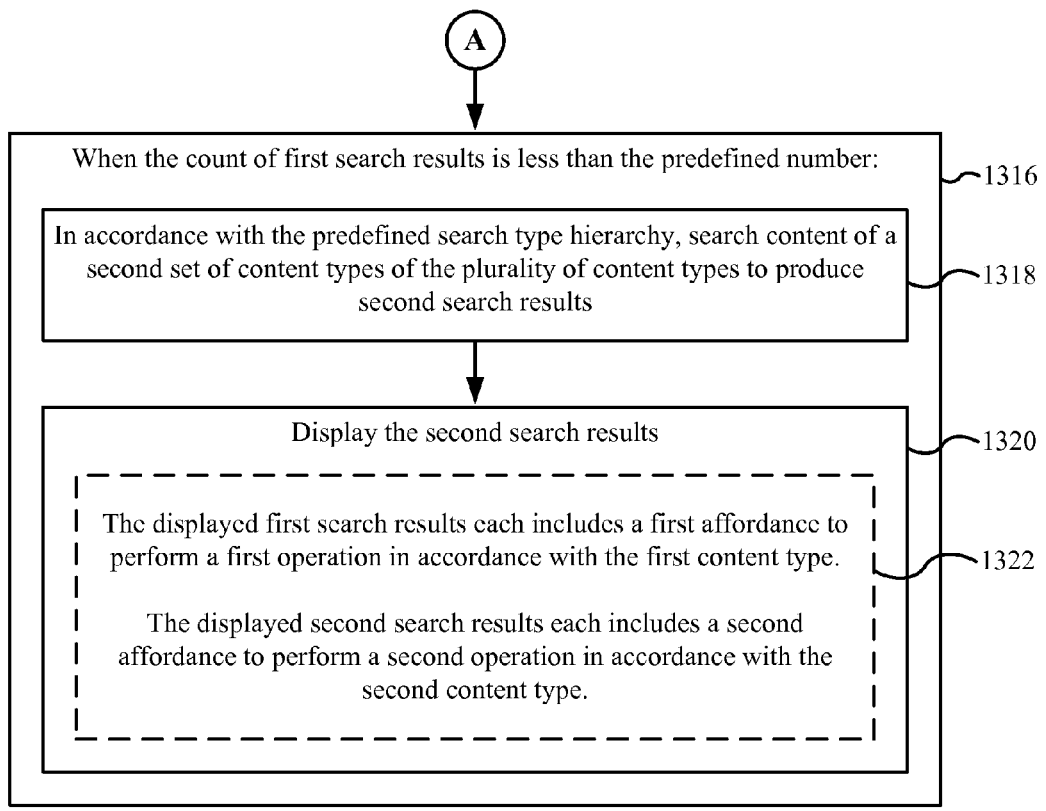

FIGS. 13A-13B include a flow chart of another method 1300 of search, in accordance with some implementations. In various implementations, some operations in of method 1300 may be combined and/or the order of some operations may be changed from the order shown in the figures. Also, in some implementations, operations shown in separate figures (e.g., FIGS. 12A-12B) and/or discussed in association with separate methods (e.g., method 1200) may be combined to form other methods, and operations shown in the same figure and/or discussed in association with the same method may be separated into different methods.

In some implementations, one or more operations in method 1300 are performed at a client device (e.g., a mobile client device, such as client device 1408/1410, as described with reference to FIG. 14 and/or FIG. 15). In some embodiments, one or more operations in method 1300 are performed by a social network server system (e.g., server system 1411, as described with reference to FIG. 14 and/or FIG. 16). For ease of explanation, the entirety of method 1300 is described as being performed by a client device (e.g., a mobile client device).

The client device receives (1302), in a social media messaging program, a search request including one or more search terms. This operation is analogous to operation 1202 (FIG. 13A) and thus the details are not repeated here.

In accordance with a predefined search type hierarchy, the client device searches (1304) content of a first set of content types of a plurality of content types to produce first search results. The search is based on the search request. The predefined search type hierarchy specifies an order with which content types in the plurality of content types are to be searched. In some embodiments, the plurality of content types includes (1304) one or more of the group consisting of: user pages corresponding to users who are connected with the user, public pages followed by the users, user pages corresponding to users who are not connected with the user, public pages not followed by the users, local files, local directories, and web content. In some embodiments, the first set of content types consist of (1306) a single first content type and second set of content types consist of a single second content type.

For example, in some embodiments, the predefined search type hierarchy specifies that the user's contacts are to be searched first (e.g., the first set of content types consist of a single content type, to wit, the user's contacts), user pages corresponding to users who are not connected with the user, public pages not followed by the users, and web content should be searched second (e.g., the second set of content types consist of two content types), and a general web search (e.g., of websites) should be performed third.

In some embodiments, the predefined search type hierarchy is based on a current user interface. For example, the user's contacts are to be search first because the user interface is a user interface for searching the user's contacts. In addition, since a user interface for searching a user's contacts is more generally a search for people, the next search, in one example, is for user pages corresponding to users who are not connected with the user. Because a web search is the most general in this example, a search of web content is to be performed last. Alternatively, in some embodiments, the predefined search type hierarchy is user defined.

The client device determines (1310) a count of the first search results. For example, if the one or more search terms consist of the word "Ben", and the search results in 10 first search results (e.g., 10 user contact's matching the search term "Ben") then the count is 10.

When the count of first search results is greater than or equal to a predefined number, the client device displays (1312) the first search results and affordances for searching content of one or more other content types in the plurality of content types. For example, in some embodiments, the predefined number is three (or five, or six), so when the count of first search results is 10, the client device displays the 10 first search results (or a subset thereof). Further, as shown in FIG. 4B, the client device displays affordances for searching content of one or more other content types in the plurality of content types (e.g., the search navigation bars 431, 432, and 433). In some embodiments, the predefined number is (1314) one. Stated another way, as long the client device has something to display as a first search result, it displays the first search result (or plurality of first search results). But if there are no first search results to display, the client device moves on to searching the second set of content types, as described below.

When the count of first search results is less than the predefined number: in accordance with the predefined search type hierarchy, the client devices searches (1316) content of a second set of content types of the plurality of content types to produce second search results. Stated another way, as long the client device has enough to display as a first search result (as defined by the predefined number), it displays the first search results. But if there are not enough first search results to display (e.g., none), the client device moves on to searching the second set of content types. The client device displays (1316) the second search results.

In some embodiments, the displayed first search results each includes (1318) a first affordance to perform a first operation in accordance with the first content type. The displayed second search results each includes a second affordance to perform a second operation in accordance with the second content type. For example, when the first search results are user contacts, in some embodiments, the first operation redirects the user to a user interface displaying information about a respective contact. When the second search results are user pages corresponding to users who are not connected with the user, in some embodiments, the second operation performs a request to "follow" or add a respective user to the user's contacts.

Figure 14:
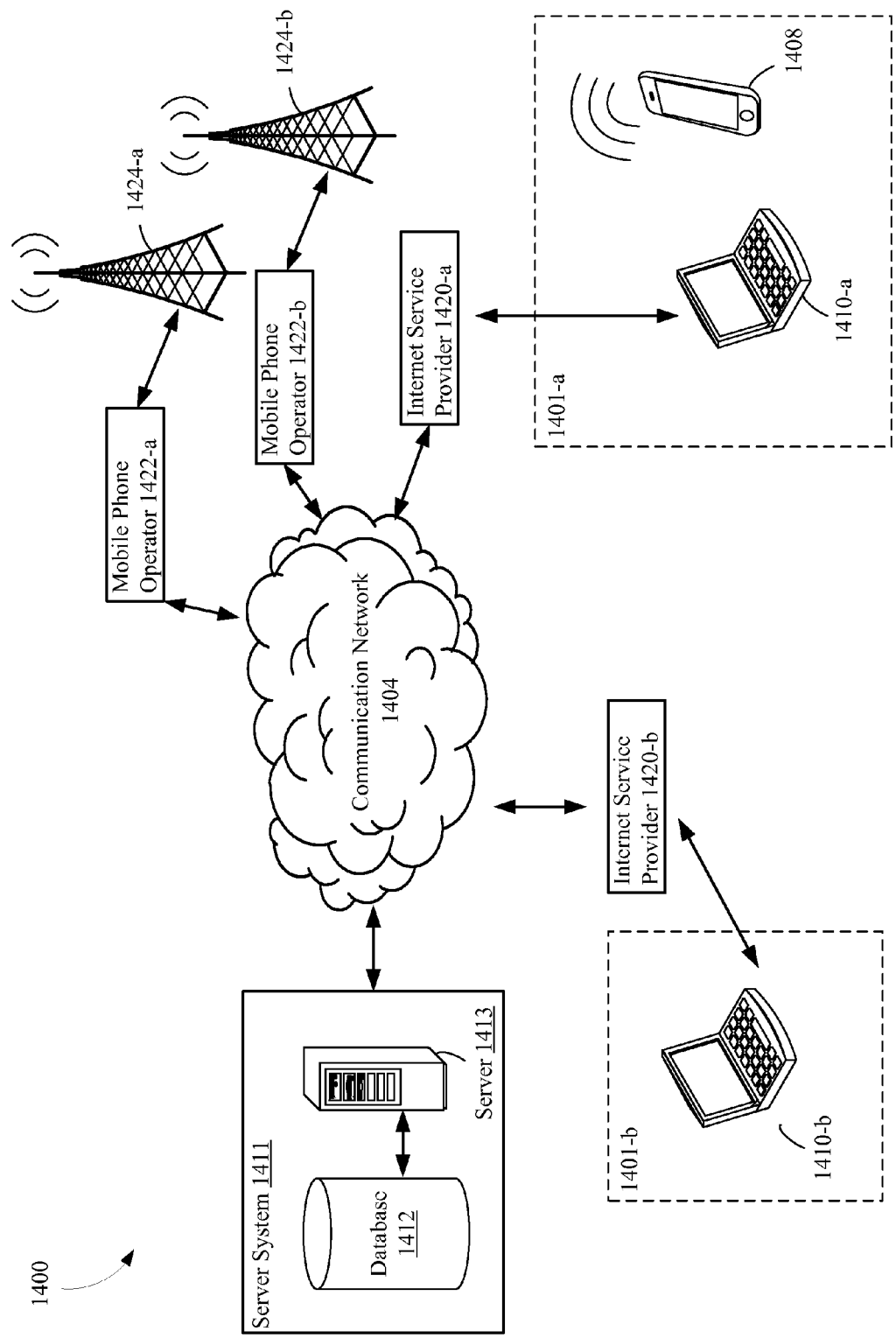
FIG. 14 is a server-client environment that includes a social media network over which secure payments are made, in accordance with some embodiments.

FIG. 14 is a diagram of a client-server environment 1400, in accordance with some implementations. The client-server environment 1400 includes a server system 1411 (e.g., a social networking server system), one or more mobile phone operators 1422 (e.g., mobile phone operator 1422-*a* and mobile phone operator 1422-*b*), one or more Internet service providers 1420 (e.g., Internet service provider 1420-*a* and Internet service provider 1420-*b*), and communications network 1404. Each of the server system 1411, the mobile phone operator 1422 (i.e. wireless carrier), and the Internet service providers 1420 are capable of being connected to the communication network 1404 in order to exchange information with one another and/or other devices and systems. Within the server system 1411, there is a server computer 1413 for receiving and processing data received from mobile client devices 1408 and personal/laptop computers 1410 (hereinafter "client devices 1408/1410"). For example, in some circumstances, server system 1411 receives a search requests from a client device (e.g., mobile phone 1408), processes data (e.g., search terms) included in these requests, and so on.

Within the server system 1411, there is also a database 1412 for storing information (e.g., search indices). Additionally, the mobile phone operator 1422 and the Internet service provider 1420 are operable to connect client devices 1408/1410 to the communication network 1404 as well. For example, a smart phone 1408 is operable with the network of the mobile phone operator 1422-*a*, which includes for example, a base station 1424-*a*. Similarly, for example, a first user's laptop computer 1410-*a* (or tablet, desktop, workstation or the like) is connectable to the network provided by a first Internet service provider 1420-*a*, which is ultimately connectable to the communication network 1404. A second user's laptop computer 1410-*b* (or tablet, desktop, workstation or the like) is connectable to the network provided by a second Internet service provider 1420-*b*, which is ultimately connectable to the communication network 1404.

When a respective client device 1408/1410 is connected to network 1404, and thereby connected to server system 1411, the respective client device 1408/1410 is said to be in an "online state." Conversely, when a respective client device 1408/1410 is not connected to network 1404, and thereby not connected to server system 1411, the respective client device 1408/1410 is said to be in an "offline state."

The communication network 1404 may be any combination of wired and wireless local area network (LAN) and/or wide area network (WAN), such as an intranet, an extranet, including a portion of the Internet. It is sufficient that the communication network 1404 provides communication capability between client devices and servers. In some implementations, the communication network 1404 uses the HyperText Transport Protocol (HTTP) to transport information using the Transmission Control Protocol/Internet Protocol (TCP/IP). HTTP permits a client device to access various resources available via the communication network 1404. However, the various implementations described herein are not limited to the use of any particular protocol.

Moreover, those skilled in the art will appreciate from the present application that any number of such devices and/or systems may be provided in a client-server environment, and particular devices may be altogether absent. In other words, the client-server environment 1400 is merely an example provided to discuss more pertinent features of the present application.

Figure 15:
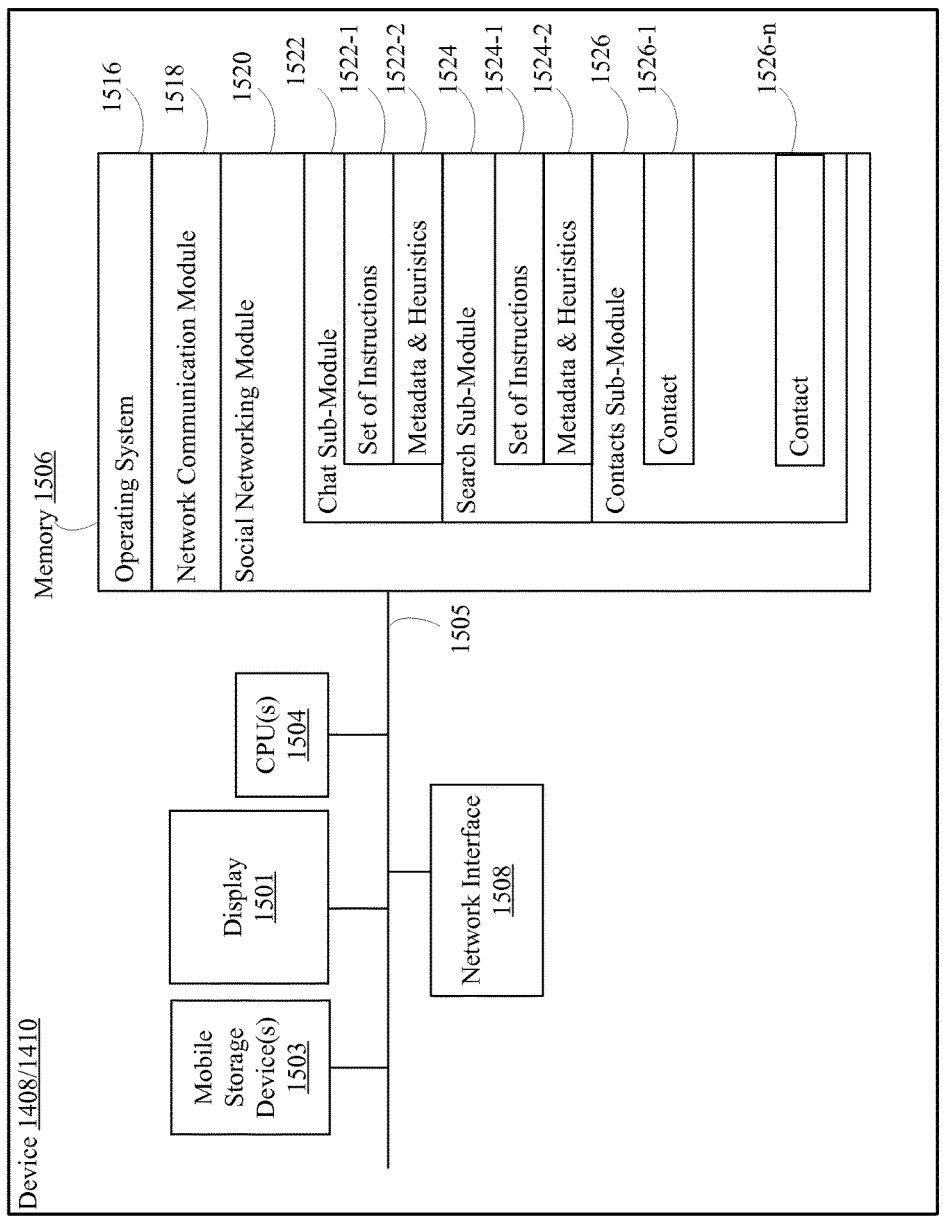
FIG. 15 is a structural block diagram of a client device, in accordance with some embodiments.

FIG. 15 is a block diagram illustrating a client device 1408/1410, discussed above with reference to FIG. 14, in accordance with some implementations. While certain specific features are illustrated, those skilled in the art will appreciate from the present disclosure that various other features have not been illustrated for the sake of brevity and so as not to obscure more pertinent aspects of the implementations disclosed herein.

To that end, client device 1408/1410 includes one or more processing units (CPUs) 1504, one or more network or other communications interfaces 1508, memory 1506, one or more mobile storage devices 1503, display 1501, and one or more communication buses 1505 for interconnecting these and various other components. The communication buses 1505 may include circuitry (sometimes called a chipset) that interconnects and controls communications between system components. Memory 1506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1506 may optionally include one or more storage devices remotely located from the CPUs 1504. Memory 1506, including the non-volatile and volatile memory devices within memory 1506, comprises a non-transitory computer readable storage medium.

In some implementations, memory 1506 or the non-transitory computer readable storage medium of memory 1506 stores the following programs, modules and data structures, or a subset thereof including an operating system 1516, a network communication module 1518, a social networking module 1520.

The operating system 1516 includes procedures for handling various basic system services and for performing hardware dependent tasks.

The network communication module 1518 facilitates communication with other devices (e.g., server system 1411, FIG. 14 and/or FIG. 16) via the one or more communication network interfaces 1508 (wired or wireless) and one or more communication networks, such as the Internet, other wide area networks, local area networks, metropolitan area networks, and so on.

The social networking module 1520 is configured to allow a user to perform certain social networking operations available through, such as chatting with other users (e.g., with chat sub-module 1522, which includes a set of instructions 1522-1 and optionally metadata 1522-2), posting pictures, text, and video, on a website corresponding to the social network (e.g., hosted by sever 1411, FIG. 14 and/or FIG. 15), etc. Therefore, in some embodiments, the social networking module 1520 is a social media messaging program. The social networking module 1520 is also configured to receive search requests including search terms from a user of the client device 1408/1410. The social networking module 1520 searches (using searching sub-module 1524, which includes a set of instructions 1524-1 and heuristics and metadata 1524-2), among the user's contacts locally stored on the mobile client device, for contacts matching with the one or more search terms to produce first search results. These local contacts (e.g., contact 1526-1 through 1526-n) are stored in a contacts sub-module (1526).

Figure 16:
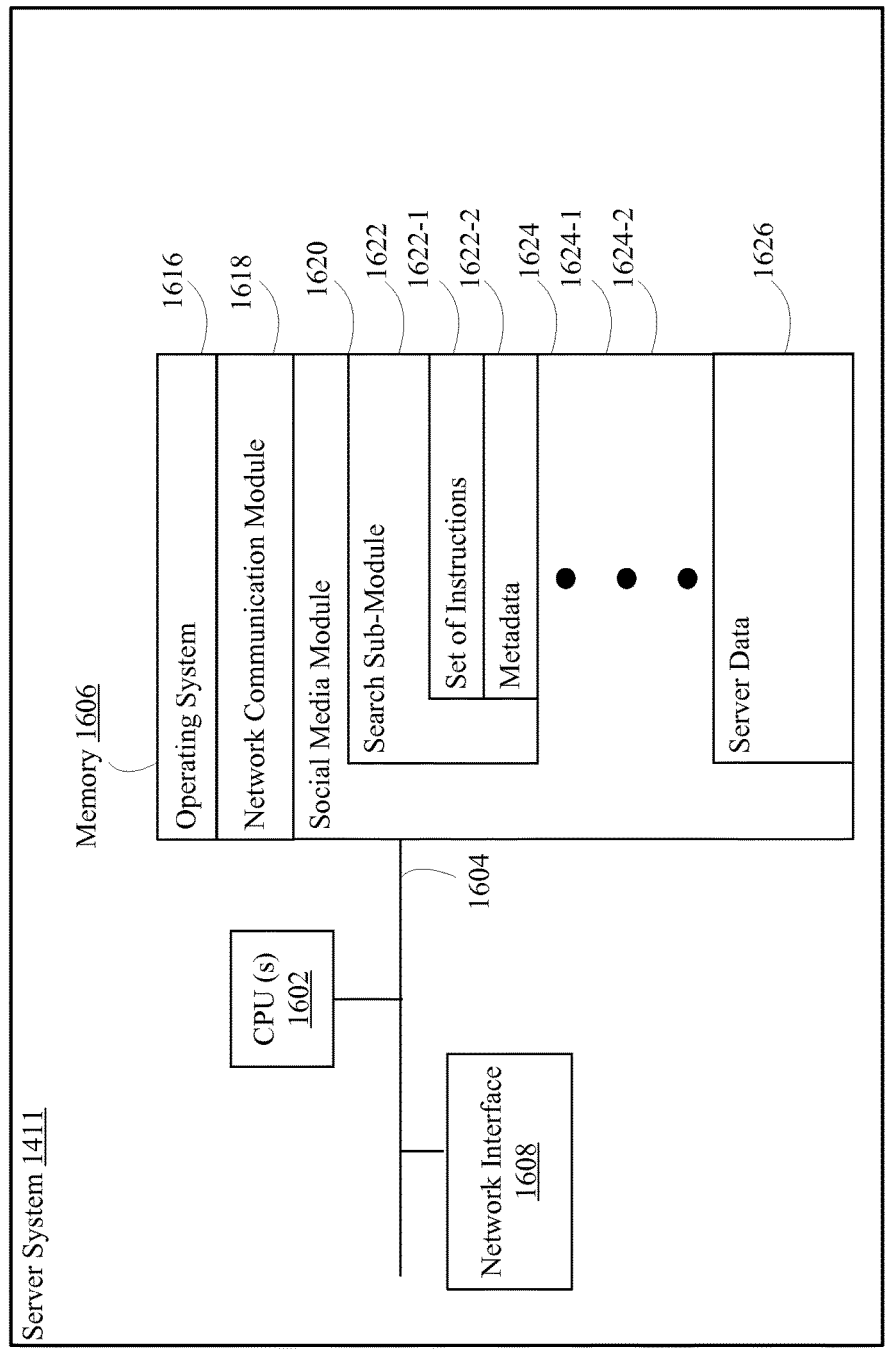
FIG. 16 is a structural block diagram of a server system, in accordance with some embodiments.

FIG. 16 is a block diagram illustrating a server system 1411, discussed above with reference to FIG. 14, in accordance with some implementations. While certain specific features are illustrated, those skilled in the art will appreciate from the present disclosure that various other features have not been illustrated for the sake of brevity and so as not to obscure more pertinent aspects of the implementations disclosed herein.

To that end, server system 1411 includes one or more processing units (CPUs) 1604, one or more network or other communications interfaces 1608, memory 1606, and one or more communication buses 1604 for interconnecting these and various other components. The communication buses 1604 may include circuitry (sometimes called a chipset) that interconnects and controls communications between system components. Memory 1606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1606 may optionally include one or more storage devices remotely located from the CPUs 1602. Memory 1606, including the non-volatile and volatile memory devices within memory 1606, comprises a non-transitory computer readable storage medium.

In some implementations, memory 1606 or the non-transitory computer readable storage medium of memory 1606 stores the following programs, modules and data structures, or a subset thereof including an operating system 1616, a network communication module 1618, a social media module 1620.

The operating system 1616 includes procedures for handling various basic system services and for performing hardware dependent tasks.

The network communication module 1618 facilitates communication with other devices (e.g., client devices 1408/1410) via the one or more communication network interfaces 1608 (wired or wireless) and one or more communication networks, such as the Internet, other wide area networks, local area networks, metropolitan area networks, and so on.

The social media module 1620 is configured to provide various social media (e.g., social networking) services to users (e.g., users of client devices 1408/1410). These services include chat, webpage hosting, image and video hosting, etc. In addition, social media module 1620 provides searching services via a search sub-module 1622, which includes a set of instructions 1622-1 and metadata 1622-2. For example, search sub-module 1622 will crawl and index user pages so that other users can search and find new friends (e.g., by adding as friend or contact users whose user pages are the results of a search). In some embodiments, these user pages are stored in server data 1426, which can be implemented on database 1412 (FIG. 14).

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the word "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be mixed or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description for purpose of explanation has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method of searching content, comprising:
   at a mobile client device executing a social media messaging program:
   receiving, in the social media messaging program, a search request including one or more search terms;
   in accordance with a predefined search type hierarchy, searching content of a first set of content types of a plurality of content types to produce first search results, wherein:
   the search is based on the search request; and
   the predefined search type hierarchy specifies an order with which content types in the plurality of content types are to be searched;
   determining a count of the first search results;
   when the count of first search results is greater than or equal to a predefined number, displaying the first search results and affordances for searching content of one or more other content types in the plurality of content types;
   when the count of first search results is less than the predefined number:
   in accordance with the predefined search type hierarchy, searching content of a second set of content types of the plurality of content types to produce second search results; and
   displaying the second search results.

2. The method of claim 1, wherein the search request is received from a user of the social media program and the plurality of content types includes one or more of the group consisting of: user pages corresponding to users who are connected with the user, public pages followed by the users, user pages corresponding to users who are not connected with the user, public pages not followed by the users, local files, local directories, and web content.

3. The method of claim 1, wherein the first set of content types consist of a single first content type and second set of content types consist of a single second content type.

4. The method of claim 1, wherein:
   the displayed first search results each includes a first affordance to perform a first operation in accordance with the first set of content types; and
   the displayed second search results each includes a second affordance to perform a second operation in accordance with the second set of content types.

5. The method of claim 1, wherein the predefined number is one.

6. The method of claim 1, wherein the predefined search type hierarchy is user-defined.

7. The method of claim 1, wherein the predefined search type hierarchy is dependent upon a user interface in which the search request is entered.

8. A non-transitory computer-readable storage medium storing instructions that, when executed by a mobile client device executing a social media messaging program, cause the mobile client device to perform the operations of:
   receiving, in the social media messaging program, a search request including one or more search terms;
   in accordance with a predefined search type hierarchy, searching content of a first set of content types of a plurality of content types to produce first search results, wherein:
   the search is based on the search request; and
   the predefined search type hierarchy specifies an order with which content types in the plurality of content types are to be searched;
   determining a count of the first search results;
   when the count of first search results is greater than or equal to a predefined number, displaying the first search results and affordances for searching content of one or more other content types in the plurality of content types;
   when the count of first search results is less than the predefined number:
   in accordance with the predefined search type hierarchy, searching content of a second set of content types of the plurality of content types to produce second search results; and
   displaying the second search results.

9. The non-transitory computer-readable storage medium of claim 8, wherein the search request is received from a user of the social media program and the plurality of content types includes one or more of the group consisting of: user pages corresponding to users who are connected with the user, public pages followed by the users, user pages corresponding to users who are not connected with the user, public pages not followed by the users, local files, local directories, and web content.

10. The non-transitory computer-readable storage medium of claim 8, wherein the first set of content types consist of a single first content type and second set of content types consist of a single second content type.

11. The non-transitory computer-readable storage medium of claim 8, wherein:
the displayed first search results each includes a first affordance to perform a first operation in accordance with the first set of content types; and
the displayed second search results each includes a second affordance to perform a second operation in accordance with the second set of content types.

12. The non-transitory computer-readable storage medium of claim 8, wherein the predefined number is one.

13. The non-transitory computer-readable storage medium of claim 8, wherein the predefined search type hierarchy is user-defined.

14. The non-transitory computer-readable storage medium of claim 8, wherein the predefined search type hierarchy is dependent upon a user interface in which the search request is entered.

15. A mobile client device, comprising:
one or more processors; and
memory storing instructions that, when executed by the one or more processors, cause the mobile client device to perform the operations of:
receiving, in a social media messaging program, a search request including one or more search terms;
in accordance with a predefined search type hierarchy, searching content of a first set of content types of a plurality of content types to produce first search results, wherein:
the search is based on the search request; and
the predefined search type hierarchy specifies an order with which content types in the plurality of content types are to be searched;
determining a count of the first search results;
when the count of first search results is greater than or equal to a predefined number, displaying the first search results and affordances for searching content of one or more other content types in the plurality of content types;
when the count of first search results is less than the predefined number:
in accordance with the predefined search type hierarchy, searching content of a second set of content types of the plurality of content types to produce second search results; and
displaying the second search results.

16. The mobile client device of claim 15, wherein the search request is received from a user of the social media program and the plurality of content types includes one or more of the group consisting of: user pages corresponding to users who are connected with the user, public pages followed by the users, user pages corresponding to users who are not connected with the user, public pages not followed by the users, local files, local directories, and web content.

17. The mobile client device of claim 15, wherein the first set of content types consist of a single first content type and second set of content types consist of a single second content type.

18. The mobile client device of claim 15, wherein:
the displayed first search results each includes a first affordance to perform a first operation in accordance with the first set of content types; and
the displayed second search results each includes a second affordance to perform a second operation in accordance with the second set of content types.

19. The mobile client device of claim 15, wherein the predefined number is one.

20. The mobile client device of claim 15, wherein the predefined search type hierarchy is user-defined.

* * * * *